United States Patent [19]

Boreland

[11] Patent Number: 4,891,754

[45] Date of Patent: Jan. 2, 1990

[54] MICROINSTRUCTION SEQUENCER FOR INSTRUCTING ARITHMETIC, LOGICAL AND DATA MOVE OPERATIONS IN A CONDITIONAL MANNER

[75] Inventor: Charles P. Boreland, Waterbury, Conn.

[73] Assignee: General DataComm Inc., Middlebury, Conn.

[21] Appl. No.: 69,430

[22] Filed: Jul. 2, 1987

[51] Int. Cl.$^4$ .............................................. G06F 9/22
[52] U.S. Cl. ................................ 364/200; 364/244.6; 364/262.8; 364/259.7; 364/263.3
[58] Field of Search ... 364/200 MS File, 900 MS File

[56] References Cited

U.S. PATENT DOCUMENTS

| | | | |
|---|---|---|---|
| 3,768,077 | 10/1973 | Nier et al. | 364/900 |
| 4,079,447 | 3/1978 | Garziera | 364/200 |
| 4,365,312 | 12/1982 | Nakano et al. | 364/900 |
| 4,367,524 | 1/1983 | Budde et al. | 364/200 |
| 4,393,468 | 7/1983 | New | 364/200 |
| 4,450,525 | 5/1984 | Demuth et al. | 364/200 |
| 4,476,523 | 10/1984 | Beauchamp | 364/200 |
| 4,546,431 | 10/1985 | Horvath | 364/200 |
| 4,615,004 | 9/1986 | Chevillat et al. | 364/200 |
| 4,800,486 | 1/1989 | Horst et al. | 364/200 |

Primary Examiner—Raulfe B. Zache
Assistant Examiner—Florin Munteanu-r
Attorney, Agent, or Firm—David P. Gordon

[57] ABSTRACT

A microinstruction sequencer capable of directing an arithmetic-logic unit to conduct conditional operations is disclosed and generally includes a ROM and a selection circuit. The ROM has a memory of m bits wide and n words long, wherein for an m bit wide word in the ROM which defines a conditional operation, a first plurality of bits of the m bits are allocated to a first set of bits for instructing the arithmetic-logic unit as to the function it is to perform, a second plurality of bits of the m bits are allocated to a second set of bits for instructing the arithmetic-logic unit as to the function it is to perform, and a third plurality of bits of the m bits are allocated to a set of control bits. The selecting circuit selects one set of bits from at least the first and second set of bits, and includes a controller for receiving the control bits and controlling the selection by the selection circuit in response thereto. By selecting between the first and second sets of bits, the microinstruction sequencer conditionally instructs the arithmetic-logic unit.

26 Claims, 2 Drawing Sheets

BLOCK DIAGRAM OF DSP AND DATA I/O

DETAILED BLOCK DIAGRAM OF MIS DECODER

| FIG. 3A | FIG. 3B |

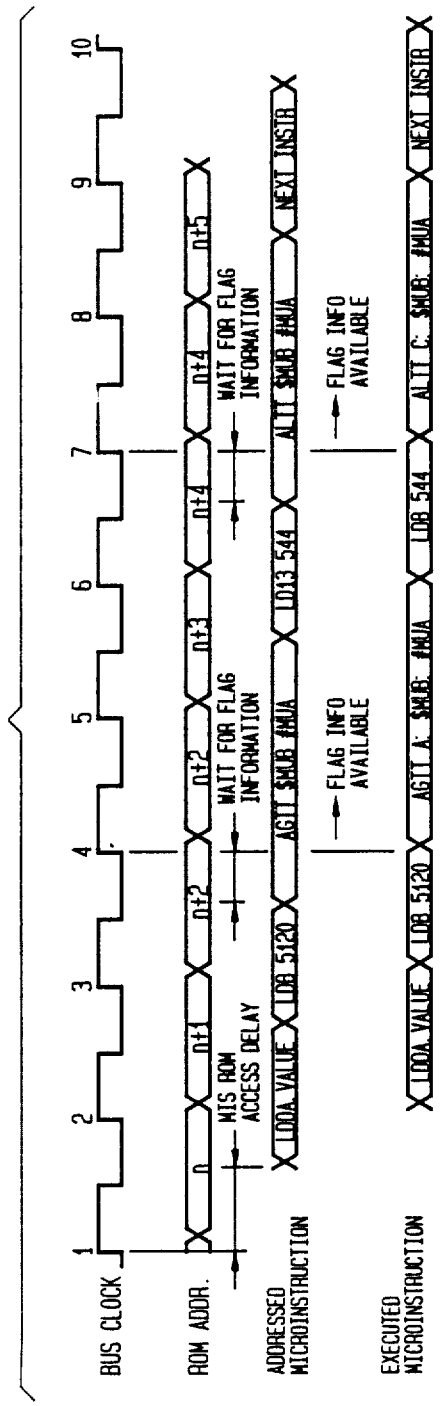

SIMPLIFIED BLOCK DIAGRAM OF THE
SERIAL ARITHMETIC PROCESSOR (SAP)

BLOCK DIAGRAM OF THE LOG, FLOAT, AND ANTILOG SECTION OF THE SERIAL ARITHMETIC PROCESSOR

| FIG. 6 |
|---|
| FIG. 6A |
| FIG. 6B |

LOG, FLOATING POINT, AND ANTILOG CONVERSION TIMING
(WORST CASE EXECUTION TIME 10 CLOCK CYCLES)

BLOCK DIAGRAM OF SAP SERIAL MULTIPLIER

| FIG. 9A |
| FIG. 9B |
| FIG. 9C |

14 X 8 BIT LINEAR MULTIPLICATION TIMING
(WORST CASE EXECUTION TIME 10 CLOCK CYCLES)

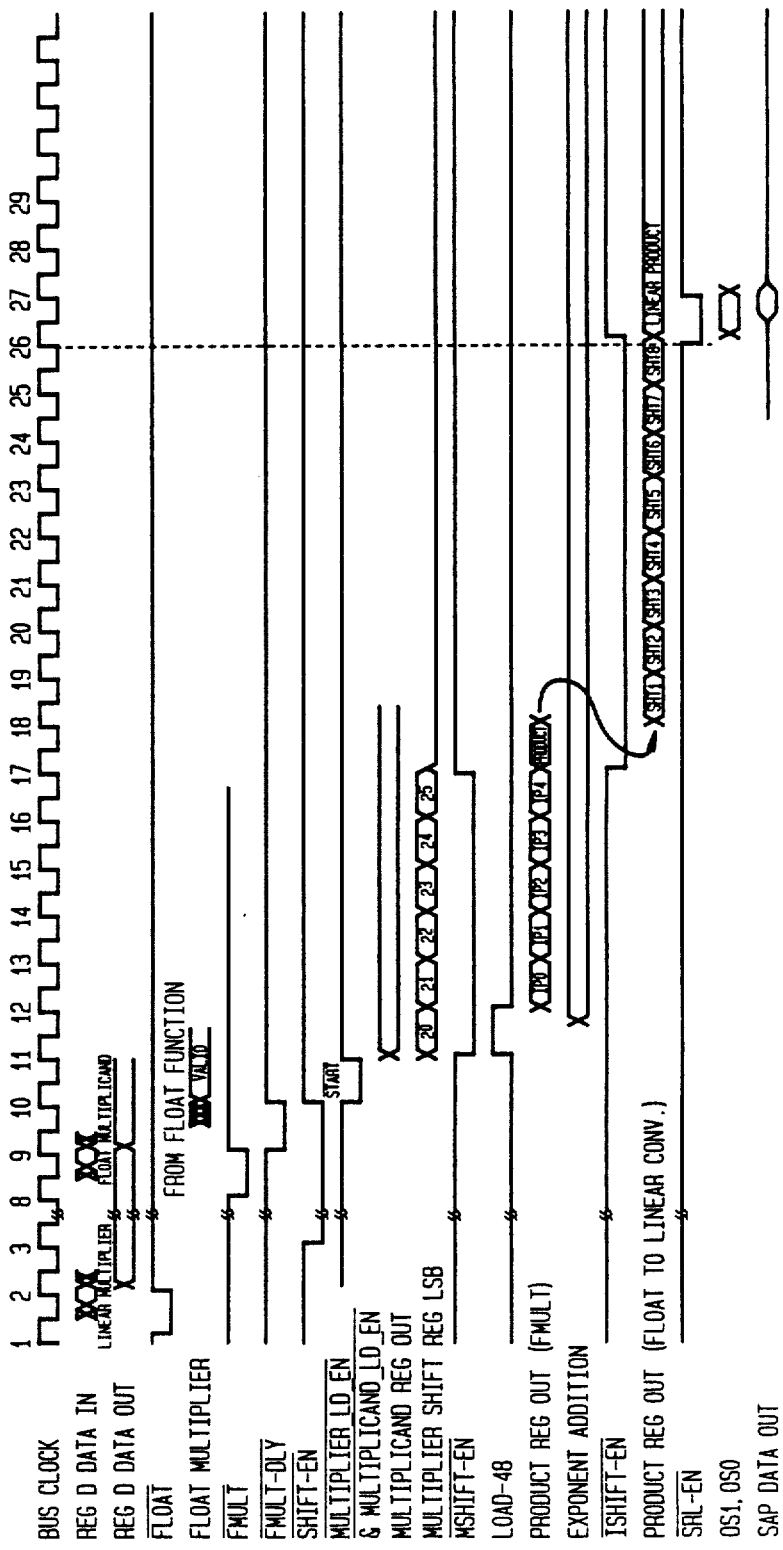

MICROINSTRUCTION SEQUENCER FOR INSTRUCTING ARITHMETIC, LOGICAL AND DATA MOVE OPERATIONS IN A CONDITIONAL MANNER

This application is related to commonly-owned, concurrently filed applications entitled, "Digital Signal Processor Architecture" U.S. Ser. No. 069,433, "Serial Arithmetic Processor" U.S. Ser. No. 069,432, now U.S. Pat. No. 4,858,163, and "Parallel Arithmetic-Logic Unit for Use as an Element of a Digital Signal Processor" U.S. Ser. No. 069,431, all of which are hereby incorporated by reference herein.

BACKGROUND

This invention relates generally to microinstruction sequencers of digital signal processors. The invention more particularly relates to a microinstruction sequencer of a digital signal processor where the microinstruction sequencer is arranged to instruct arithmetic, logical, and data move operations in a conditional manner thereby enabling the implementation of the high-level IF-THEN-ELSE construct.

Microinstruction sequencers (MIS) typically include a ROM having a sequence of microinstructions contained therein. Many such MIS's have a comprehensive set of branch, arithmetic and logical commands which permit an arithmetic logic unit (ALU) or other hardware of a digital signal processor (DSP) to perform such functions. For example, "jump", "call" and "return" commands are all typically used in a sequence of microinstructions to permit the microinstructions to implement branching. Among the known arithmetic commands commonly used in a microinstruction sequence are "add", "subtract", "absolute value", "negate", "increment", and "decrement". Likewise, logic commands such as "AND", "OR", and "XOR" are commonly found in the microinstruction set of a MIS. Further, data move commands for moving data from one location to a desired location and control commands for controlling flags and/or hardware are also known in the context of MIS's.

While the MIS's of the art have been able to accomplish desired results with the branch, logical and arithmetic commands typically available, it should be appreciated that conditional arithmetic, conditional logic and conditional data move functions have not been available as microinstructions. Rather, in implementing the equivalent of the conditional IF-THEN-ELSE function, the DSPs of the art have required an IF-THEN function implemented with a "branch" command. For example, in implementing the following two IF-THEN-ELSE instructions, IF value>5120 THEN value=5120 ELSE value=-value IF value<544 THEN value=544 ELSE value=-value the following microcode could be provided for a TMS32010 DSP, where the output "value" would reside in an accumulator:

|   | LAC | value | (load accumulator with value) |
|---|---|---|---|
|   | SUB | K544 | (subtract 544 from accumulator) |
|   | BGEZ | 1$S | (IF accumulator => $ THEN BRANCH to location 1$S, "value => 544") |
|   | LAC | K544 | (load accumulator with 544) |

-continued

|   | B | 3$S | (BRANCH to location 3$S) |
|---|---|---|---|
| 1$S | SUB | K4576 | (subtract 4576 (512$−544) from accumulator) |
|   | BLEZ | 2$S | (IF accumulator <= $ THEN BRANCH to location 2$S, "value <= 512$ − 544") |
|   | LAC | K512$ | (load accumulator with 512$) |
|   | B | 3$S | (BRANCH to location 3$S |
| 2$S | LAC | value | (reload accumulator with value) |
| 3$S |   |   | (continue) |

While such a microcode sequence will accurately carry out the conditional instructions, those skilled in the art will appreciate that numerous instructions and cycles are required to do the same. Indeed, for the two IF-THEN-ELSE functions, ten instructions taking at least ten cycles are required.

SUMMARY OF THE INVENTION

It will be appreciated that the identical set of IF-THEN-ELSE instructions set forth in the Background which required ten instructions and at least ten cycles may be accomplished by the instant invention with five instructions and as few as seven cycles according to the following microcode:

| LDM | A, value | (load register A with value) |
|---|---|---|
| LDD | B, 512$ | (load register B with 512$) |
| \| AGTT | A | (IF A > B THEN A = B, ELSE A = A) |
| \| $MVB |   |   |
| \| #MVA |   |   |
| LDD | B, 544 | (load register B with 544) |
| \| ALTT | C | (IF A > B THEN C = B, ELSE C = A) |
| \| $MVB |   |   |
| \| #MVA |   |   |
|   | (continue) |   | where the $ and # notation is used to indicate a secondary field in a microinstruction. Thus, the AGTT-$MYB-#MYA and ALTT-$MVB-#MVA are each a single instruction requiring two cycles. As a result of the fewer instructions and cycles required, the memory requirements of the system are decreased while speed is increased.

It is therefore an object of the invention to provide a microinstruction sequencer capable of instructing arithmetic, logical, and data move operations in a conditional manner.

It is a further object of the invention to provide a microinstruction sequencer for a DSP, where the microinstruction sequencer is arranged to direct a branch, arithmetic, logic, move, and control commands as well as a plurality of conditional logical, arithmetic, and data move functions.

It is yet another object of the invention to provide a microinstruction sequencer for directing the implementation of an ADPCM algorithm in a DSP, wherein the microinstruction sequencer includes conditional logical, arithmetic, and data move microinstructions.

In accord with the objects of the invention, a microinstruction sequencer capable of directing an arithmetic-logic unit means to conduct conditional arithmetic, logical and data move operations is provided and comprises:

(a) a ROM having a memory of m bits wide and n words long; and (b) selecting means for selecting one set of bits from a plurality of sets of bits, including control means for controlling said selection, wherein a first plurality of bits in said m bits are allocated to a first set of bits for instructing said arithmetic-logic unit means as to the function it is to perform, a second plurality of bits in said m bits are allocated to a second set of bits for instructing said arithmetic-logic unit means as to the function it is to perform, and a third plurality of bits in said m bits are allocated to a set of control bits for instructing said control means of said selecting means, and wherein in response to at least said set of control bits, said selecting means selects from said first and second sets of bits which instruct said arithmetic-logic unit means as to the function it is to perform.

The microinstruction sequencer typically also includes an arithmetic-logic decoder means having a first register for receiving the set of bits chosen by the selecting means and other registers for receiving other bits of said m bit word, wherein the set of bits received in said first register instruct said arithmetic-logic unit means as to a function it is to perform. A waiting means of one cycle is further provided in the control means for waiting for flag inputs into the control means to settle prior to using them to control the selecting means. Also, preferably, two additional pluralities of the m bits are allocated to first and second shift control sets of bits, wherein the control means for selecting among the sets of bits for instructing the arithmetic logic unit means as to the function it is to perform controls the selection of the sets of bits controlling the shifter of the arithmetic-logic unit means.

Other aspects of the microinstruction sequencer of the invention include: a microinstruction address register for locating the pointer to the ROM; an incrementer for incrementing the value of the ROM pointer stored in the microinstruction address register; a stack for storing "next" addresses so that the ROM program can sequentially continue after a subroutine has been called, carried out, and issued a "return" command; and a microinstruction next address multiplexer for choosing the next address to be inserted into the microinstruction address register from at least the stack, the incrementer, and an address contained in the operand of the ROM microcode last issued from the ROM. The controller of the previously set forth selecting means preferably further acts to control the microinstruction next address multiplexer as well as the stack.

Other objects, features, and advantages of the invention will become apparent to those skilled in the art upon reference to the following detailed description of the invention and the accompanying drawings.

BRIEF DESCRIPTION OF THE DRAWINGS

FIG. 1 comprising

FIG. 4 is a timing diagram for the microinstruction sequencer of the digital signal processor of FIG. 1;

FIG. 6 comprising

FIG. 10b is a timing diagram for the second common means of FIG. 9 for conducting a floating point multiplication.

DETAILED DESCRIPTION OF THE PREFERRED EMBODIMENT

Figure 1A:
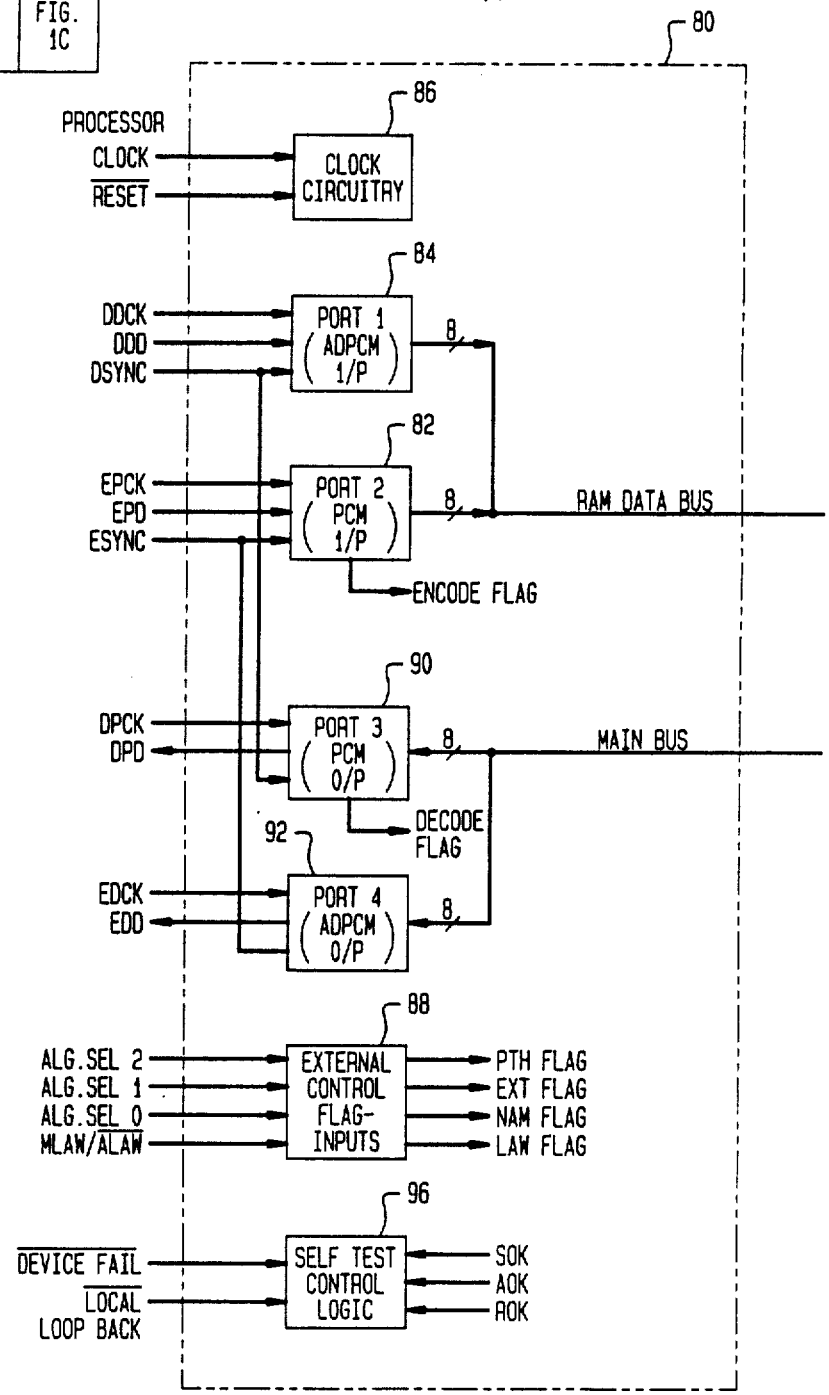
FIGS. 1A, 1B and 1C, is a block diagram of a digital signal processor in conjunction with an I/O section of the VLSI on which the digital signal processor is implemented.
Figure 1B:
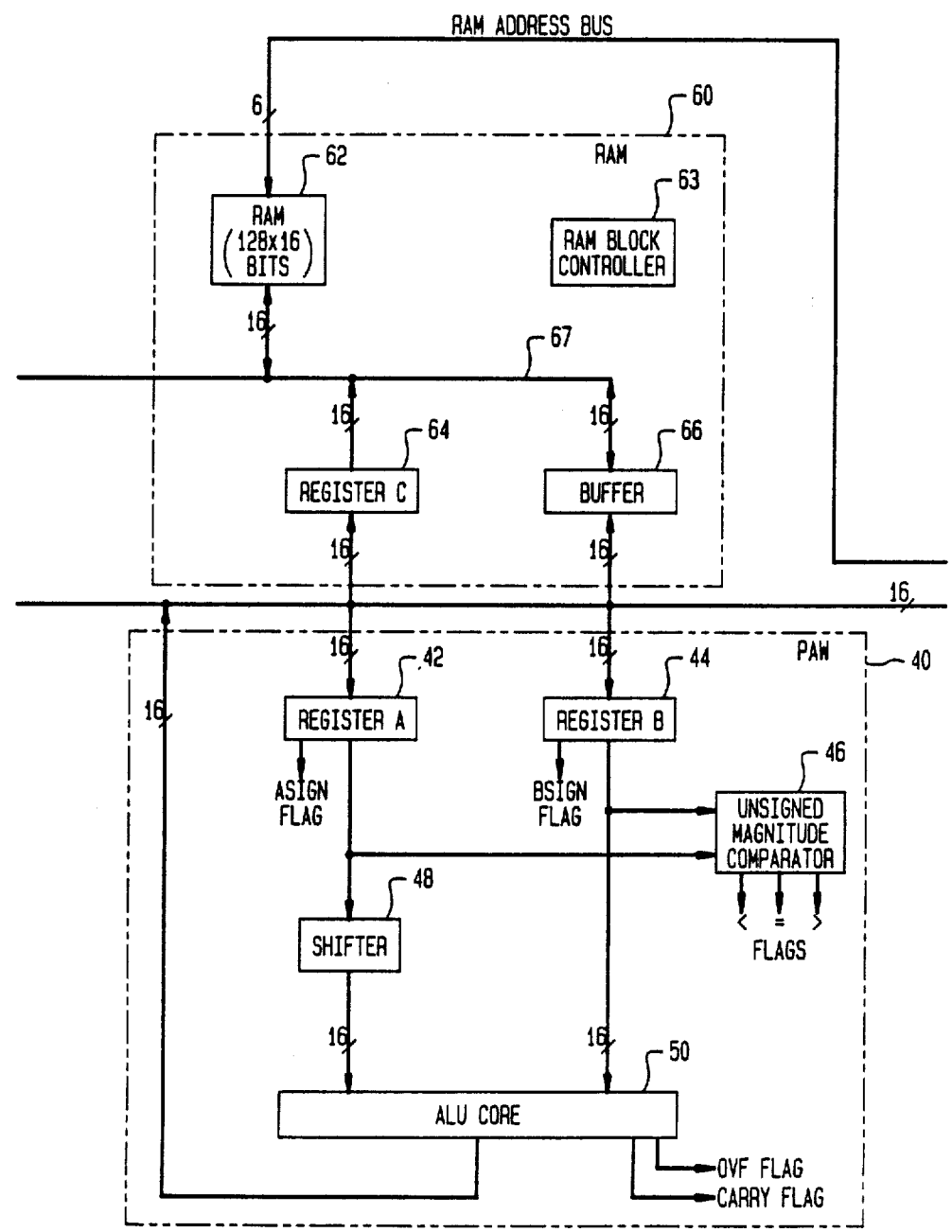
Figure 1C:
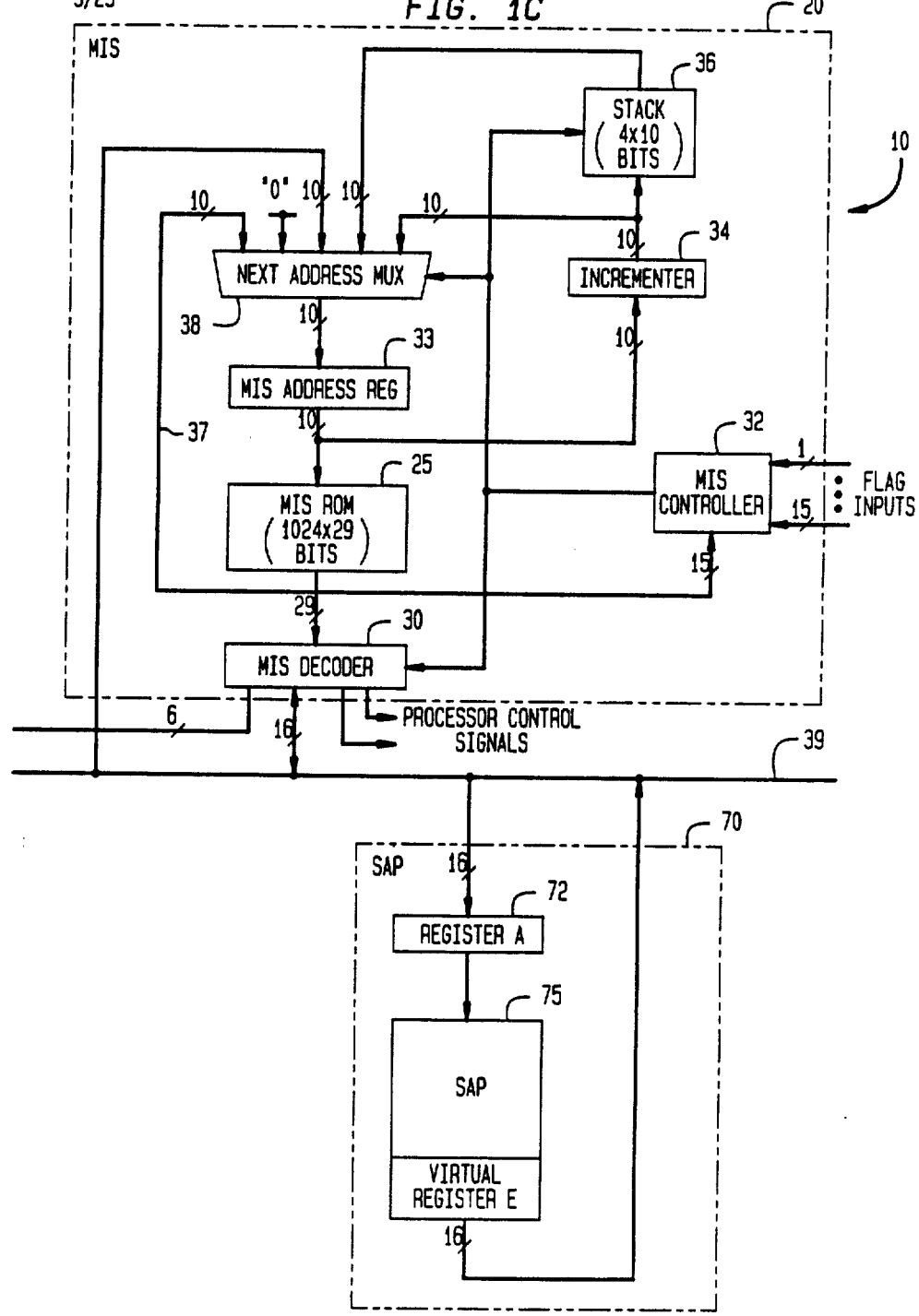
Figure 2A:
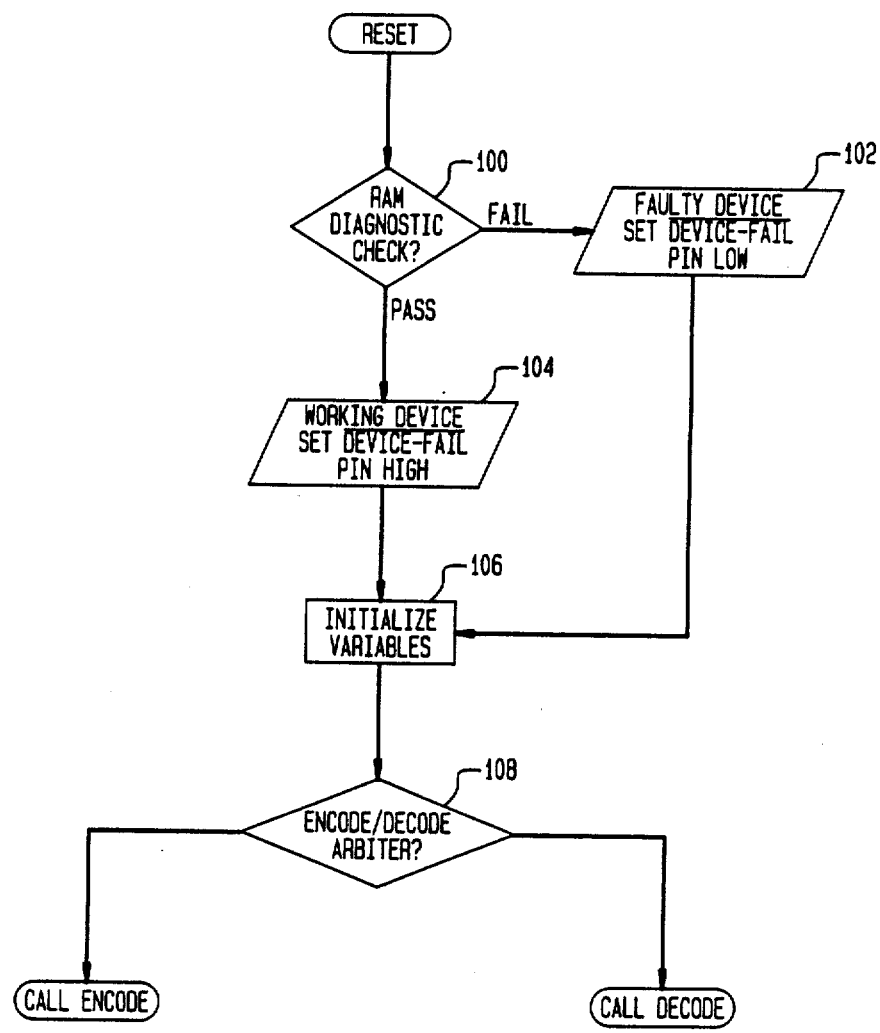
FIGS. 2a–2e are top level flow diagrams for accomplishing the ADPCM algorithm with the DSP of FIG. 1.
Figure 2B:
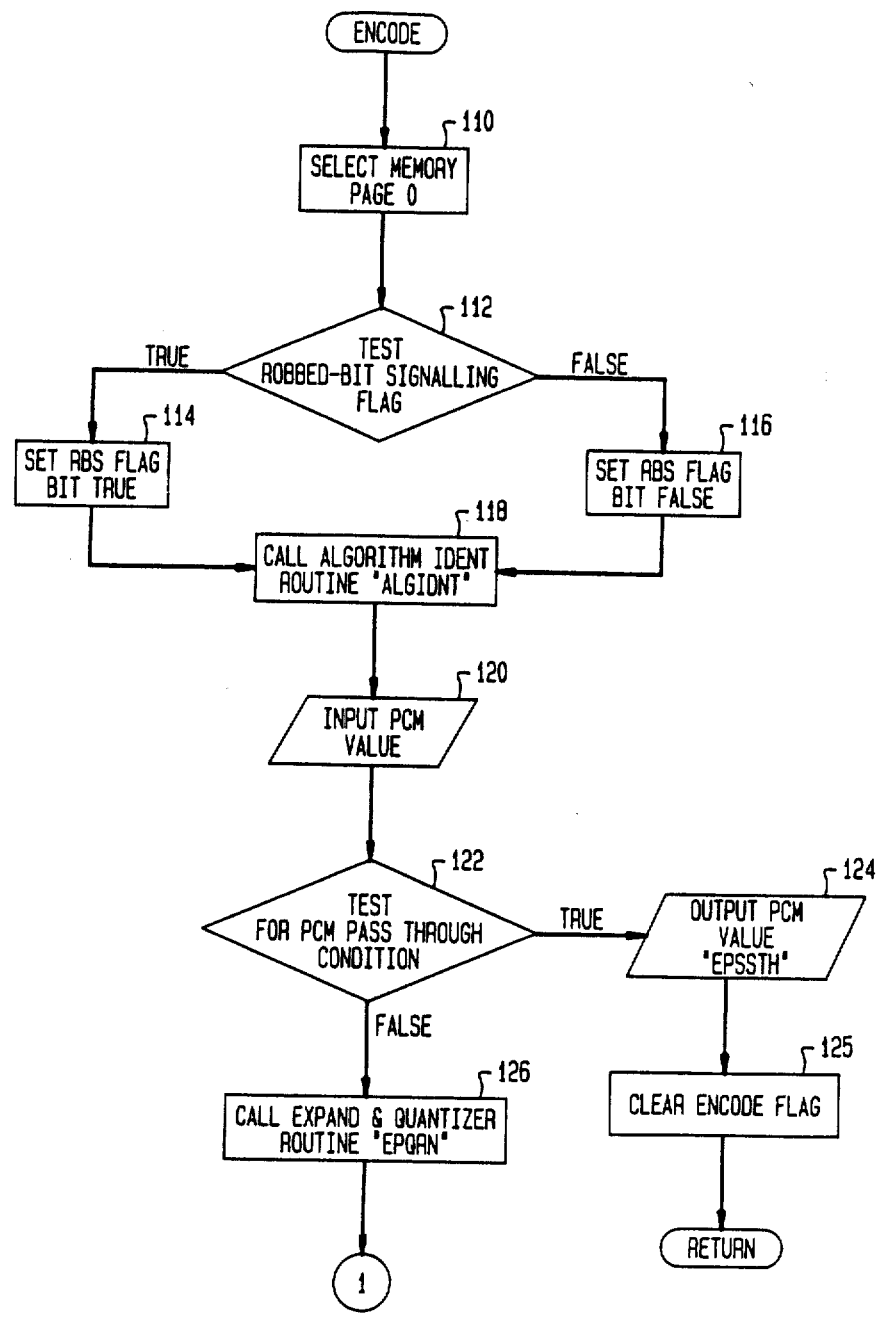
Figure 2C:
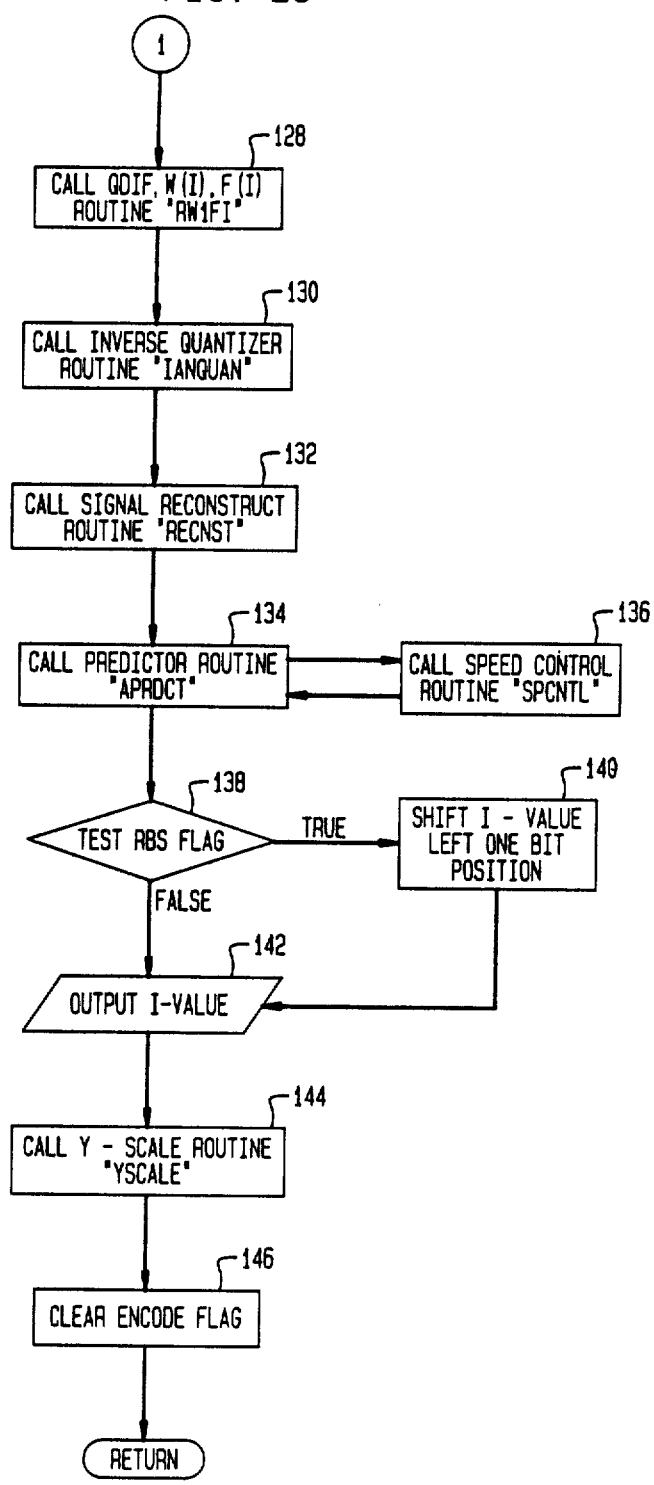
Figure 2D:
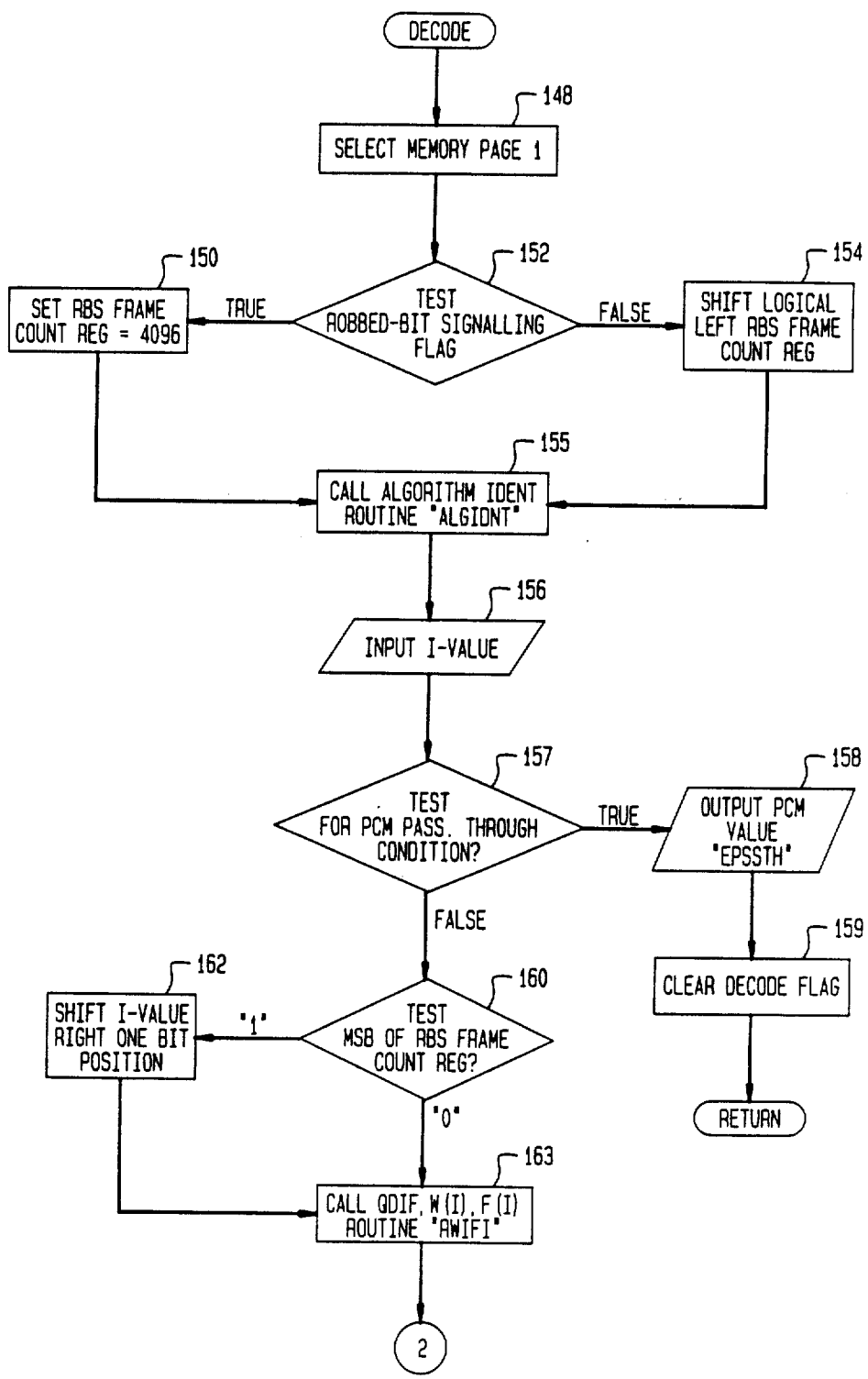
Figure 2E:
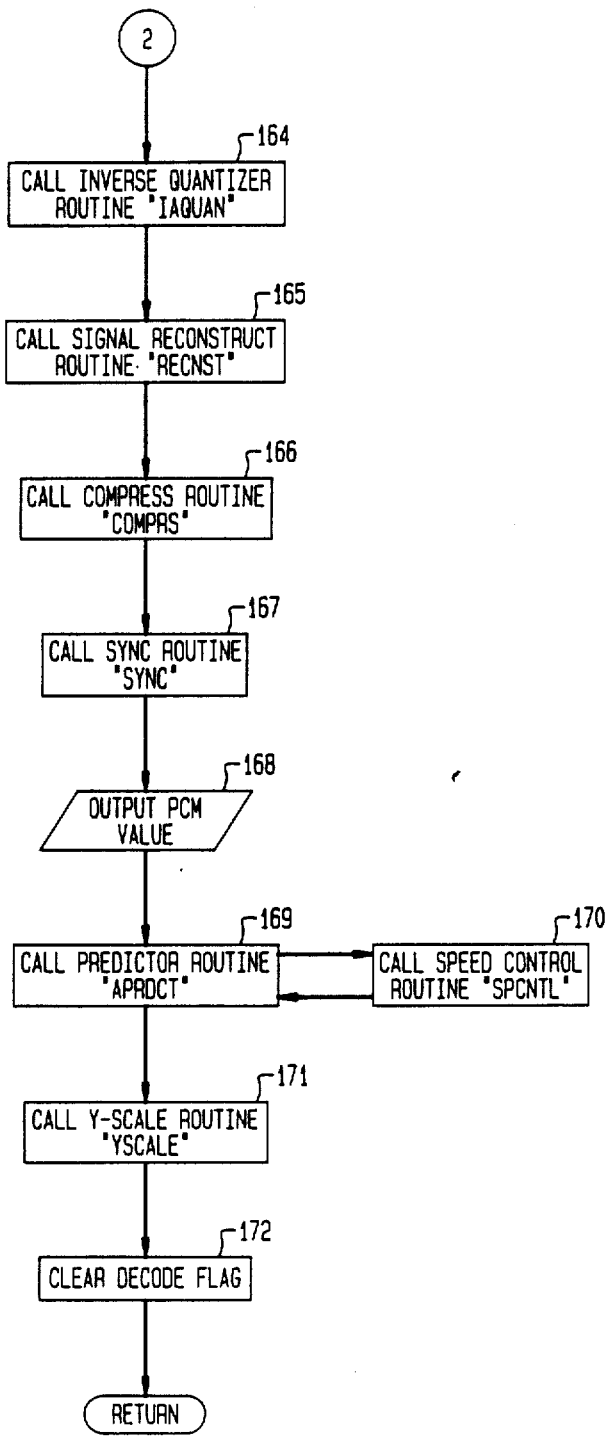

In accord with the preferred embodiment of the invention, a microinstruction sequencer 20 for a digital signal processor capable of performing the ADPCM algorithm is seen in FIG. 1. At the heart of the MIS 20 is a one thousand twenty-four by twenty-nine bit (i.e. one thousand twenty-four words of twenty-nine bits in length, where bit position twenty-eight is the location of the msb and bit position zero is the location of the lsb) microinstruction ROM 25 which controls the performance of the ADPCM algorithm, and a microinstruction decoder 30 which receives the twenty-nine bits of each ROM word into its various registers and forwards the information as control information or data to various destinations. As will be described in detail hereinafter, the microinstruction decoder 30 preferably includes a multiplexer which is used in one of the MIS sequencer 20 fields for selecting one set of bits from a plurality of sets of bits in the ROM word which are used to instruct an arithmetic-logic unit 40. The multiplexer is preferably controlled by the microsequencer controller 32 which also controls other circuitry of the MIS 20.

Before reviewing the microinstruction fields (such as the conditional field) and the capabilities of the MIS of the invention, a review of the other circuitry of the MIS is useful. Thus, the microinstruction sequencer 20 of the invention preferably includes a microinstruction address register 33 for locating a ROM pointer (not shown) and an incrementer 34 for incrementing the value of the microinstruction address register 33 and ROM pointer with each clock cycle. Further, to help permit subroutines to be able to be carried out, a four level last-in-first-out stack 36 is provided for storing "next" addresses. In this manner, when the ROM program calls a subroutine at another location, the next address which is produced by the incrementer 34 is stored in the stack 36. When the microinstructions (29 bit words) of the subroutine are completed and a "return" command is issued, the microinstruction address register 33 is loaded with the address from the top of stack 36. Finally, a microinstruction next address multiplexer 38 is provided to permit only one of the four-level stack 36, the incrementer 34, the ROM 25 (in the form of a direct address) and a data bus 39 to provide the information for updating the microinstruction address register 33. It will be appreciated that the four-level stack 36 and the microinstuction next address multiplexer 38 are both under the control of the microsequencer controller 32 which as aforestated also acts to control a multiplexer in the microinstruction decoder 30. The microsequencer controller 32 is in turn controlled by flags which are set by circuitry external to the MIS 20.

Of the twenty-nine bits exiting ROM 25 with each clock cycle, the two most significant bits are preferably reserved for defining the field of the microinstruction. Thus, field zero ("00") has been set as the arithmetic, logical and data move field; field one ("01") as the branch field; field two ("10") as the immediate data field; and field three ("11") as the conditional arithmetic field. The mnemonic and corresponding function of the arithmetic, logic, and data move capabilities (field "00") of the MIS of the invention are set forth below in Table 1a, and the bit assignments for the same are seen in Table 1b. Likewise, the mnemonics and corresponding functions and bit assignments of the branch, immediate data, and conditional arithmetic fields are seen respectively in Tables 2a and 2b, 3a and 3b, and 4a and 4b below, while secondary field microinstructions which may be embedded in (i.e. occur in parallel with) the microinstructions of fields zero and two, and the bit assignments therefor are set forth in Tables 5a and 5b. In all fields, the following symbols and abbreviations are used:

| symbol | meaning |
| --- | --- |
| sh | magnitude shift value in the range of +4 to −8 |
| dd | destination registers (A, B, C, D) or combination |
| mm | direct data memory address |
| n | direct branch address |
| * | bus data |
| i | set i=J for Jump, i=C for Call, or i=R for Return |
| N | if N is not present then condition is true; if N is present then condition is false |
| b | sixteen bit immediate data value |
| < > | items within brackets are user defined |
| [ ] | items within brackets are optional |

Particularly, with regard to the shift "sh" function, a shift left (positive shift) is denoted by the letter L, while a shift right (negative shift) is denoted by the letter R. Also, one to four register destinations may be specified when the register destination "dd" is set forth. Further, with regard to the letter N, if a mnemonic includes the letter "N" at the end thereof, the logical NOT of the mnemonic is carried out. If the letter "N" is not in the mnemonic, the mnemonic stays intact, i.e. the mnemonic condition is true.

As will be appreciated with reference to Tables 1a and 1b, standard arithmetic and logic commands associated with many DSPs are found in the microinstruction set of the MIS 10 of the invention. For example, addition, subtraction, absolute value, negation, incrementation, no operation, etc. are all specified as microinstructions, as are the logical microinstructions OR, AND, and XOR. In addition, a non-standard operation CVT is specified as performing a two's compliment to signed magnitude conversion or vice versa.

As an example of the arithmetic functions available and the manner in which the ROM has been coded to instruct the same, the twenty-nine bit code for the arithmetic ADD function seen in Table 1a as ADD <sh,dd> is found in Table 1b as:

00 0010 -SH- -DD- ..00 ..... .....

As previously mentioned, the first two ("00") bits define the field to be the arithmetic, logical and data move field. The next four bits "0010" in the I26-I23 bit positions uniquely define the arithmetic function to be the addition function (although as will be seen hereinafter, those four bits alone do not uniquely define all operations in field "00" as the "no operation" and some of the "data move" functions all share the same I26-I23 code). The bits in bit positions I22-I19 are then used to define the shift SH by which the contents of Register A of the PALU 40 will be shifted. As will be appreciated, since shifts of +4 to −8 are allowed, the thirteen possible values may be easily represented uniquely by the provided four bits. While the addition function supports a desired shift, those skilled in the art will recognize that various of the arithmetic operations (e.g. negation, absolute value, incrementation, etc) do not permit a shifting because the functions operate on a value located in other than Register A. Thus, for those operations, the value "0100" which corresponds to a shift of zero is specified and is located in bit positions I22-I19.

Bits I18-I15 of the twenty-nine bits operational code word for the addition function are used to signify the destination of the sum, and for the provided embodiment can comprise registers A, B, C and D. As seen by Table 1b, if the register is to receive information, the bit value for its corresponding bit location is set to zero. Of course, with the no operation function, the destination bits I18-I15 are all set to a value of one as no information is being sent to the registers because no operation is being performed. In this manner, the no operation function may be distinguished from the other data move functions, as all four bits of I18-I15 are set to a value of one for the no operation function, while for the other data move functions such a result will never arise.

Bits I10-I6, and I5-I0 of the addition function are left for secondary microinstructions which will be discussed in more detail hereinafter. Bits I14 and I13, which are left undefined in the addition function, are sometimes used with reference to secondary microinstructions, and sometimes to distinguish data move commands as will be discussed in more detail hereinfter. Finally, bits I12 and I11 contain a two bit select code which enable the output bus drivers of various blocks of the DSP including: the PALU; the serial processor; the immediate ROM data port; or the RAM, I/O ports and register C (all seen with reference to the FIG. 1). Thus, where an addition function is being carried out, the arithmetic-logic unit output bus driver will be enabled as it is the PALU which will conduct the addition of the values in the two registers associated therewith. Likewise, the sum of the values will be sent from the PALU to the specified registers.

As seen in Table 1a, not only are arithmetic and logic functions included in field "00", but data move commands are likewise included. The data in any of four registers, two data ports, or in a location of the data RAM, may be sent to any of registers A, B, C, and D. In addition, the data in a RAM location which may be specified by an address value from the ROM (LDM command) or specified by the value on a bus (LDMB command) may be sent to any of the four registers A, B, C, and D. Also supported is the data move of the compliment of the data and data moves with shifting of the data in register A.

The data move commands as outlined in Table 1b primarily rely on bits I26-I23 and I14-I11 to distinguish among them. Thus, because only a few subcombinations for bits I26-I23 uniquely remain in field "00" after the arithmetic and logical functions are defined, only three data move functions are uniquely identified by those bits. However, the remaining data move functions (except for LDM and LDMB) are identified uniquely by defining bits I14-I11 or a subcombination of those bits. The LDM and LDMB functions are defined uniquely, as seen in Table 1b, by requiring that the bits I10-I16 and I5-I0 differ in the two functions. In the LDM microinstruction, the data stored in the RAM memory location defined by bits I5-I0 is loaded into the registers set forth in bits I18-I15 (bits I10-I6 being reserved for secondary microinstructions), while in the LDMB microinstruction bits I10-I6 are specified uniquely to indicate that the RAM memory location must be defined by the value on the bus at the end of the cycle. It will be appreciated, therefore, that the LDMB microinstruction is in effect a primary microinstruction having a secondary microinstruction component.

Because all of the field "00" microinstructions with the exception of the LDMB command can be used in conjunction with a secondary microinstruction, a review of the secondary microinstruction set seen in Tables 5a and 5b is in order. In all cases, identification of the secondary microinstruction is gained by decoding bits I10-I6 as thirty-two such secondary microinstructions could be uniquely identified by the five bits. Among the secondary microinstructions are control instructions to control hardware, and in particular the serial processor of the DSP. The control instructions control an initiation of a LOG function, ANTILOG function, FLOATING POINT CONVERSION function, SIGNED MAGNITUDE MULTIPLICATION function, and FLOATING POINT MULTIPLICATION function, as well as selecting the appropriate output from the serial arithmetic processor. These particular functions are described in great detail with regard to the serial processor of the DSP. The control field in the secondary microinstruction set further permits the setting of various flags as desired, as well as the selection of pages zero and one (for ADPCM encoding and decoding) of RAM 60 of the DSP.

A second field of the secondary microinstruction set includes data output instructions which control the selection of data output ports three and four (90 and 92) of the ADPCM VLSI device. Finally, the secondary microinstruction set includes a third field which allows the RAM of the DSP to be updated. As seen in Tables 5a and 5b, the RAM address identified is updated either directly or through a bus directed technique with the bits located in locations I5-I0 defining the RAM location (i.e. data memory address) to receive the information stored in an associated register (register C) or found on the data bus. In particular, the STC microinstruction causes the RAM address specified in the operand to be updated with the value stored in register C. The STCB microinstruction causes the RAM address specified by the value on the data bus from the previous cycle (i.e. the current cycle is being executed) to be updated with the value stored in register C. In the ST microinstruction, the value on the bus is stored in the RAM address specified by the operand, while in the STB microinstruction, the value on the bus is stored in the RAM address specified by the value on the data bus from the previous cycle. It will be appreciated that where the RAM is being updated, values of zero are placed in bit positions I14 and I13 in the primary microinstruction which is in parallel with the secondary microinstruction. The reason for defining bit positions I14 and I13 in this manner is that those two bits are used within the RAM section 60 to decode which of the RAM 62, Register C 64, and Ports 1 and 2 (84 and 82) are to drive the RAM bus.

Returning to the primary microinstruction fields, the branch field, with its operations and bit assignments being defined in Tables 2a and 2b respectively, is identified by bits "01" in the two msb's of the twenty-nine bit words issuing from the ROM. The branch field supports both unconditional and conditional branching including both conditional and unconditional jumps, calls, and returns. All branching (except for the RTEI and RTDI commands which also set flags and represent the end of the encoding and decoding algorithm sections of the code) is identified in field "01" by setting both bits I26 and I25 to values of one. In addition, the branch field supports commands which clear the encoder and decoder interrupt flags of the ADPCM DSP, as well as a command which resets the microinstruction address register. These operations, and the RTEI an RTDI comands are identified by bits I26, I25, I10, and I9 as seen in Table 2b. The branch field, however, does not support secondary microinstructions.

Unconditional branching is identified by setting bits I8-I4 to the value "01111", while conditional branching will have many different values in those bit positions but never that particular value. The particular unconditional branch operation (i.e. any of two "jump", two "call", or three "return" operations) is defined by bits I3-I0, with all three return operations sharing the same I3-I0 code but with different I26 and I25 values as previously stated. Thus, a "jump" operation dictated by the operational code leaving the ROM is given a code 1001 in bits I3-I0. The address in the ROM to which the program is to jump is dictated by ten bits (I24-I15) which can generate any of the 1024 twenty-nine bit word direct address locations. If the jump operation is dictated by the value on the bus (JUMP * operation having a code 0001 in bits I3-I0), the value on the bus is taken to be the location in the ROM to which the ROM pointer must be set. In addition, where values are to be obtained from a bus, (for both conditional and unconditional branch operations) bits I14-I11 are set to "0010".

Turning to the conditional branch operations set forth in Tables 2a and 2b, it is seen that the conditional branch microinstructions include "IF-THEN-JUMP", "IF-THEN-CALL", and "IF-THEN-RETURN", with the conditionals (i.e. IF) being flag inputs derived from the PALU 40 and the I/O circuits 80. Bits I28 and I27 set forth the branch field, with bits I26 and I25 set to values of one to indicate a branch operation. Bits I24 through I15 set forth the location in ROM to which the ROM pointer is to be set if the condition set forth in bits I8 through I4 is met. Bit I8 in the conditional branch operations is reserved for permitting the opposite of the function (i.e. NOT) to be performed rather than the specified function itself. Thus, if the mnemonic set forth in Table 2a includes an N, bit I8 (N) is set to a value of "1" to indicate that the NOT of the mnemonic is to be accomplished. Otherwise, bit I8 is set to a value of "0". Also, it should be noted that in six circumstances, bit I8 is determined by the XOR of a preassigned value and the value of N which is set to "1" if the NOT is to be accomplished and to "0" otherwise.

In the conditional branch operation, bits I7 through I4 are used to uniquely define most of the operations.

However, because eighteen different conditional branch operations are specified, and only fifteen different combinations of bits I7 through I4 are available (0111 having been used to specify an unconditional branch), three conditional branch operations must share the same I7 through I4 code with three other operations. Thus, bit I8 which as aforedescribed is used for negation is used to distinguish among the operations in each of the three pairs. Since mnemonic pairs iPSA (if register A is positive) and iNGA (if register A is negative), and iPSB (if register B is positive) and iNGB (if register B is negative) are already the negatives of each other, the sharing of bit I8 has no effect at all, as the XOR of bit I8 with the value "1" where the NOT is desired simply gives the code of the other function of the pair. Likewise, with regard to iMLW and iALW which share code "1000" in bits I7 through I4, it will be understood that if A-Law is not be utilized in the ADPCM algorithm, then mu-Law is being utilized, and vice versa.

Further defining the conditional branch operations, it will be seen that bits I10, I9 an I2 are used to set the branch function which is to be implemented. Bits I10 and I9 are particularly used to control the microinstruction next address multiplexer 38. Thus, if bits I10 and I9 are both zero, the next address multiplexer 38 clears or resets the address register 33. If the bit values are "01", such as in the normal sequence of microinstructions and where the encode or decode flags are reset, the next address is taken from the incrementer 34. If the bit values are "10", a program "return" is accomplished by taking the next address from the top of stack 36. Finally, if bits I10 and I9 have the value "11", a "jump" or "call" is accomplished, with the next address being supplied by the ROM 25 or the bus 39. Bit I3 is used to distinguish between those situations, as bit I3 is set to a value of zero where a bus directed branch is to be accomplished and to a value of one where a direct branch operation is to be accomplished.

Bits I10 and I9 are also used to control the stack 36 along with bit I2. The stack has four control states: HOLD, PUSH, POP, and RESET. The HOLD state is used both where the the next address multiplexer 38 obtains its next address from the incrementer 34 (bits I10 and I9 set to "01"), and where a "jump" is executed (bits I10 and I9 set to "11"). The POP state is used when a "return" is executed (bits I10 and I9 set to "10"). The PUSH state is used when a "call" is executed (bits I10 and I9 set to "11"), and the RESET state is used when the address circuitry is to be reset (bits 10 and I9 set to "00"). Since bit values "11" in bit positions I10 and I9 could indicate either a HOLD state for a "jump" or a PUSH state for a "call", bit I2 is used to distinguish between them. Thus, where bits I10, I9, and I2 are all set to one, a "call" is indicated. If bits I10 an I9 are set to one while bit I2 is set to zero, a "jump" is indicated.

Bit I3 of the branch field is used to indicate whether the address in bits I24 through I15 is coming from the ROM operand or whether it is being taken from the least significant ten bits on the bus. If bit I3 has a zero value, the branch address is bus directed, while if bit I3 has a value of one, the branch address is dictated by the operand and is called an "direct address". Where a direct address is specified, bits I14 through I11 are left undefined. However, where the branch address is bus directed, bits I14 through I11 are set to the values "0010" which is indicative of bus direct addressing in the unconditional branch operations.

Finally, with regard to the twenty-nine bit words of the branch field, bit I0 is used to define the reset condition, and bit I1 is used to indicate whether the operation is to be a one clock cycle or two clock cycle operation. Where bit I1 has a value of "1", a two clock cycle operation is indicated, and where bit I1 has a vlaue of "0", a one clock cycle operation is indicated. This feature will be more completely discussed hereinafter with reference to the conditional arithmetic field and FIG. 4.

The above discussion of bit locations may be seen with reference to any of the branch microinstructions. For example, the operation code for the instruction if register A is greater than register B call ROM location 0011001111 would be CGTT 0011001111, and the bit assignment would be 01110011001111xxxx11001111111. The two msb's would set forth the branch field, with the next two bits indicating a branch operation. The next ten bits would define the ROM location which is being called, with the bits in the fourteen through eleven slot being undefined. Bits I10 and I9 are then set to a value of "11" to indicate a call operation, while bit I8 is set to zero to indicate the true case. Bits I7 through I4 would then set forth the select of the AGTTB flag input (i.e. "if register A is greater than register B"), while the four remaining bits would be set to a value of one to indicate that the branch operation is a direct call operation.

A third field in the microinstruction set is the immediate data field which is identified by the bits "10" in the msb bit positions. As seen in Tables 3a and 3b, the immediate data field supports only a single microinstruction, although the secondary microinstructions previously set forth with respect to Tables 5a and 5b are also supported. The single instruction supported by field "10" is to load a coefficient stored in ROM into desired registers. The single coefficient is a sixteen bit word which is listed in bit locations I26-I19, I14, I13, and I5-I0. Bit locations I18 through I15 are used to set the registers into which the sixteen bit word is to be loaded. Bits I12 and I11 are set to "01" to specify that the ROM will drive the bus 39. Finally, bits I10 throuh I6 are used for the secondary microinstructions as set forth in Tables 5a and 5b.

The final field supported in the MIS is the conditional arithmetic field designated with bit values of "11" in the two msbs. The conditional arithmetic field allows one of two arithmetic or data move commands to be implemented depending upon the state of the conditional and is therefore capable of performing the IF-THEN-ELSE function aforedescribed.

As seen in Table 4a, the conditional arithmetic field supports all of the conditionals of the branch field ("01"); i.e. iPSA, iNGA, iPSB, iNGB, etc. The arithmetic functions supported, which are chosen as a result of the determination of the conditionals, include all the arithmetic functions in the arithmetic and data move field ("00"), and also four data move functions: move register A with shift; move complement of register A with shift; move register B; and move complement of register B. Field "11" also supports a two cycle no operation function, but does not support secondary microinstructions.

The coding of the supported conditional arithmetic field functions is seen in Table 4b. As aforestated, the two msb's are set to values of one. The bit code for a first arithmetic function which can be performed is set in bit locations I26 through I23. With those four bits, sixteen unique arithmetic or data move functions may be defined. Likewise, the bit code for a second arithmetic function which can be performed is set in bits I3 through I0, allowing a different one of the sixteen unique arithmetic or data move functions to be chosen. The control bits for choosing which arithmetic function is to be performed are located in bits I8 through I4 and comply with the code set forth with regard to the identical bits in Table 3b. Thus, IF the conditional set forth in bits I8 through I4 is satisfied, THEN the arithmetic or data move function set forth in bits I26 through I23 are accomplished in the ALU; ELSE (i.e. if the conditional is not satisfied) the arithmetic or data move function set forth in bits I3 through I0 is accomplished in the ALU.

It will be seen in Table 4b that the arithmetic and data move functions set forth in bit locations I26 through I23 and I3 through I0 each include a shift capability. Thus, the shift bits for the first arithmetic or data move function are placed in bit locations I22 through I19 while the second set of shift bits are located in bit locations I14, I13, I10 and I9. The results of the arithmetic or data move functions are loadable into any or all of the four registers indicated by bits I18 through I15 (a no operation being carried out by setting all of those bits to a value of one such that no register accepts the bits). Finally, bits I12 and I11 contain a two bit select code "00" which specifies that the bus 39 is to be driven by the PALU 40.

The conditional arithmetic field operations as provided preferably take two clock cycles to be implemented due to the fact that it is desirable to wait for the flag inputs selected by bits I8 through I4 to settle prior to using them to control the selection of the arithmetic function to be performed. Indeed, it is desirable to wait until the end of a cycle before determining whether the conditional is true or not. Thus, as seen in the timing diagram of FIG. 4 which is a timing diagram for the IF-THEN-ELSE instructions IF value>5120 THEN value=5120 ELSE value=-value IF value<544 THEN value=544 ELSE value=-value, Register A is loaded with a value during clock cycle two and Register B is loaded with the value 5120 during clock cycle three. The comparison of Registers A and B to provide a flag is possibly not available until the end of clock cycle three. Thus, the AGTT $MYB #MVA microinstruction cannot be addressed until clock cycle four. In other words, because the AGTT (Register A greater than Register B) flag might not be available until the end of clock cycle three, the microinstruction to be decoded may have to be decoded during clock cycle 4 and can therefore only be executed during clock cycle 5.

An examination of the conditional branch microinstructions shows that those conditional branch microinstructions requiring flag information from the PALU are designated as two clock cycle instructions by the location of a logic "1" in bit position I1. It will be appreciated, however, that if the previous microinstruction does not cause a change in the flag state of the PALU, there is no reason to provide two clock cycles for the execution of branch microinstructions using flags from the PALU. Indeed, the branch instruction can be executed in one cycle. Those skilled in the art will recognize that this option (a one clock cycle branch) could be made available through a modification to the microcode assembler, either through the use of a different mnemonic or by appending an option character to the present mnemonic. It will also be appreciated that the bus directed conditional branch microinstructions are designated as one cycle operations. The reason for such a designation is that it is preferable to prevent the bus from floating for an entire cycle prior to being read. Thus, the microcode should be arranged such that the microinstruction immediately prior the bus directed branch does not change the flag state of the PALU. If, however, the branch address is coming from the PALU (which is not the case in the ADPCM microinstruction code) and the carry flag, for example, must be tested, then the branch must wait one cycle before executing, and the bus must be allowed to float. Again, the provision of a one or two cycle bus directed branch could be arranged through previously described modifications to the system. It is also noted that all the conditional arithmetic microinstructions (field three) are designated as two clock cycle operations. While again it might be possible to perform the conditional arithmetic microinstruction in one cycle if no flags were changing, such a situation is not supported as there are not sufficient bits in the twenty-nine bit words to allow such an arrangement given the options supported by field three. It will be appreciated however, that by changing the other options, or by adding a bit to the word length, a one or two clock cycle opion could be implemented.

Figures 3, 3A:
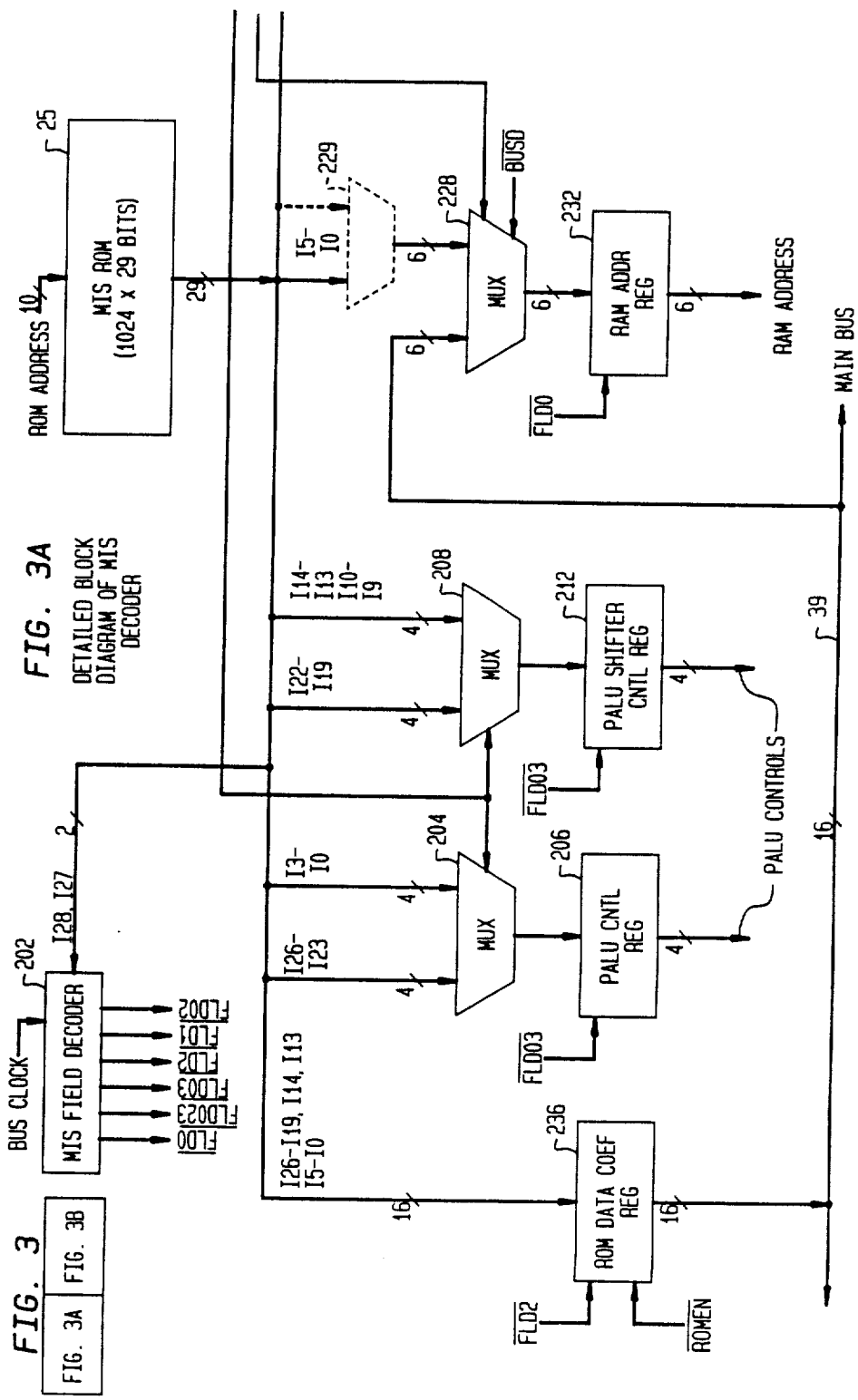
FIG. 3 comprising
FIGS. 3A and 3B is a block diagram of the microinstruction decoder of the microinstruction sequencer of the digital signal processor of FIG. 1.
Figure 3B:
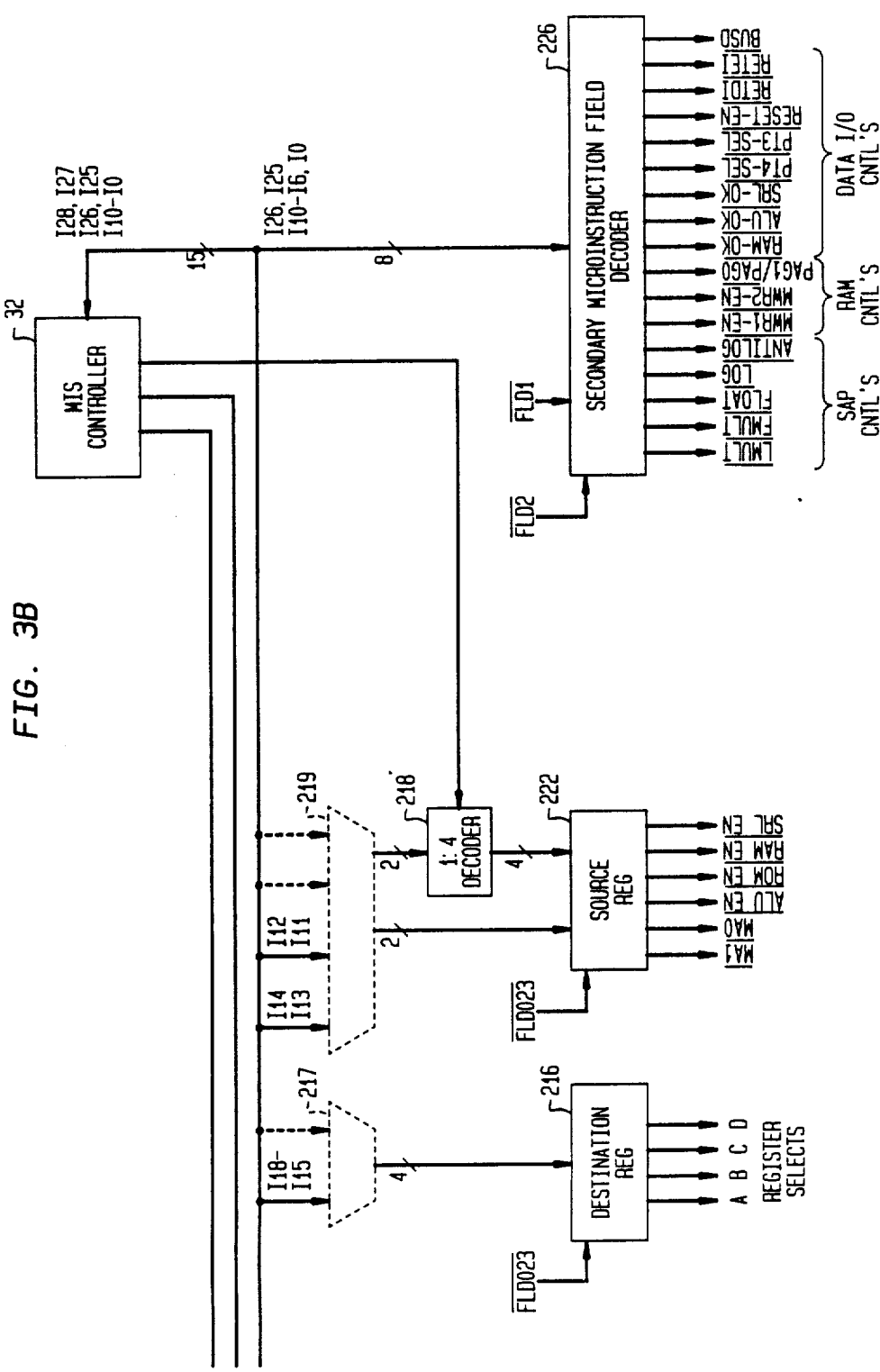
Figure 5:
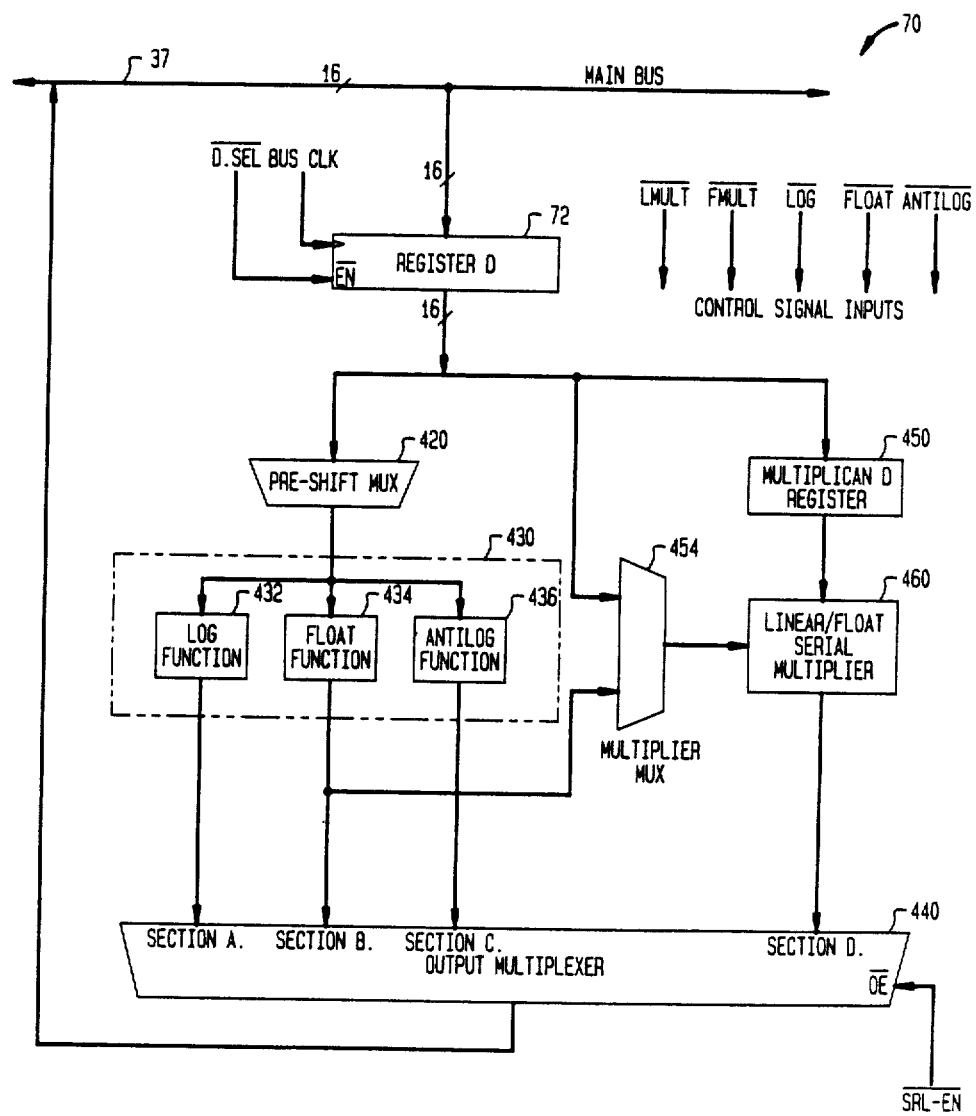
FIG. 5 is a simplified block diagram of the serial arithmetic processor of the digital signal processor of FIG. 1.
Figure 6A:
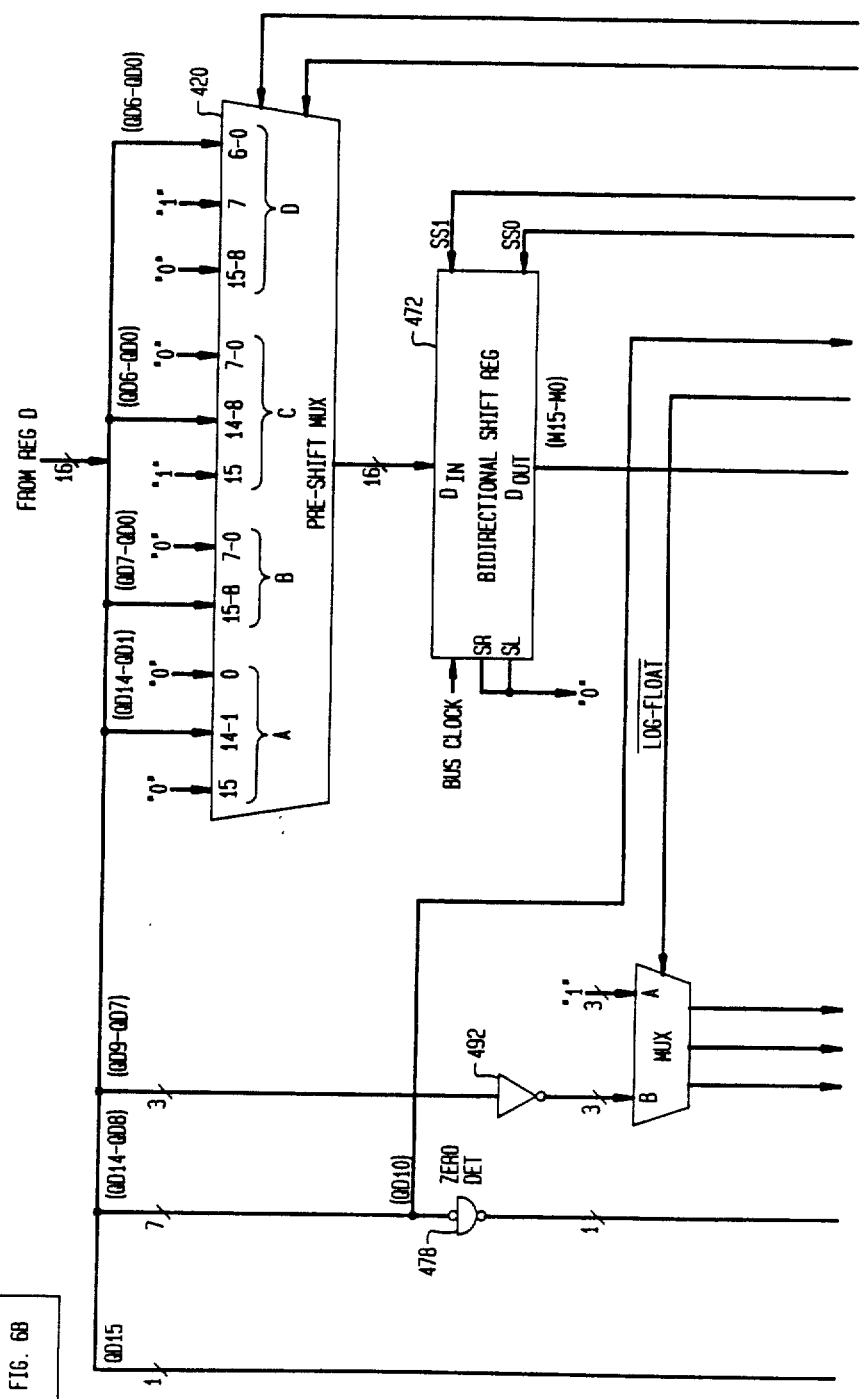
FIGS. 6A and 6B is a block diagram of the first common means of the serial arithmetic processor of the digital signal processor of FIG. 1.
Figure 6B:
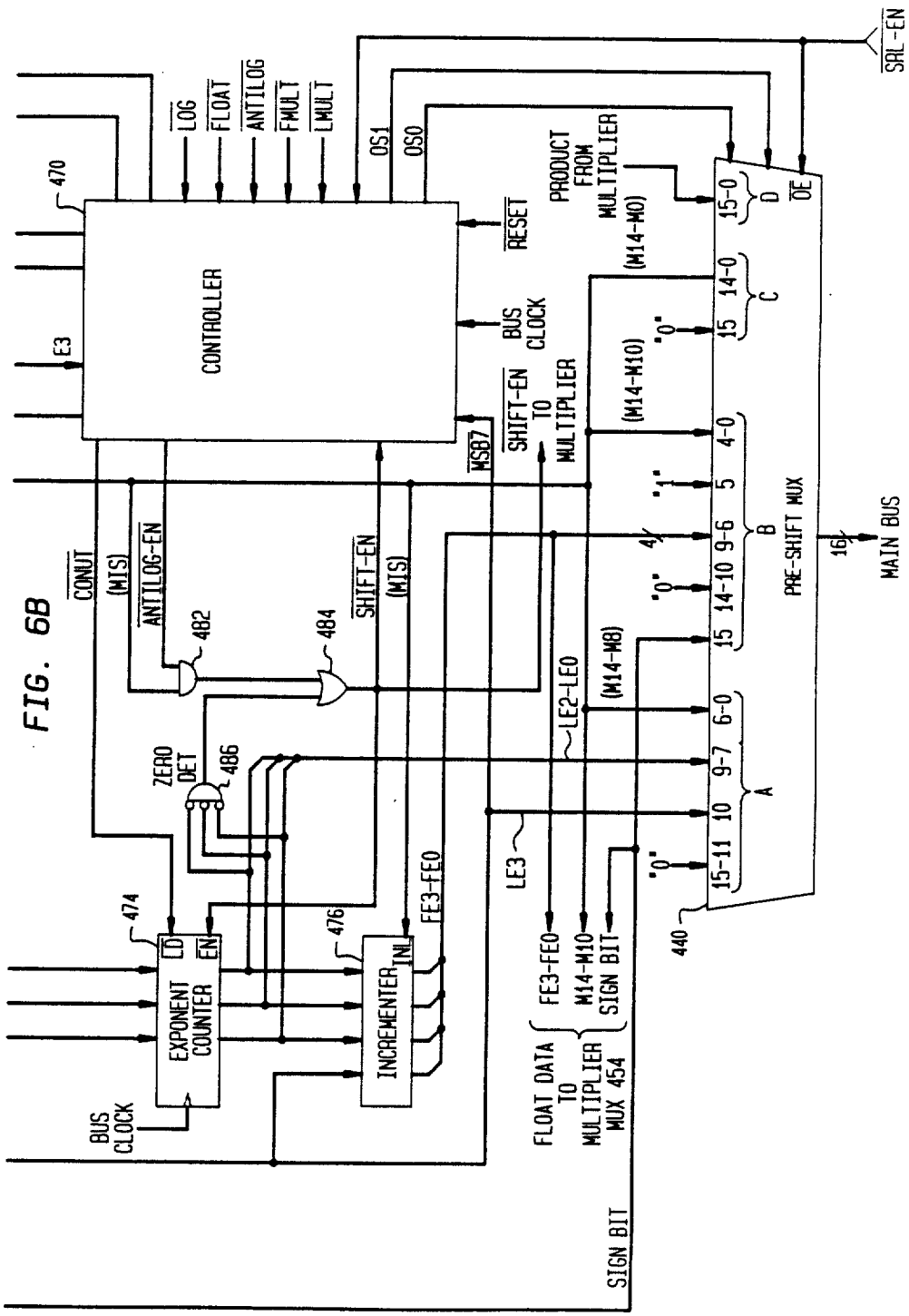
Figure 7:
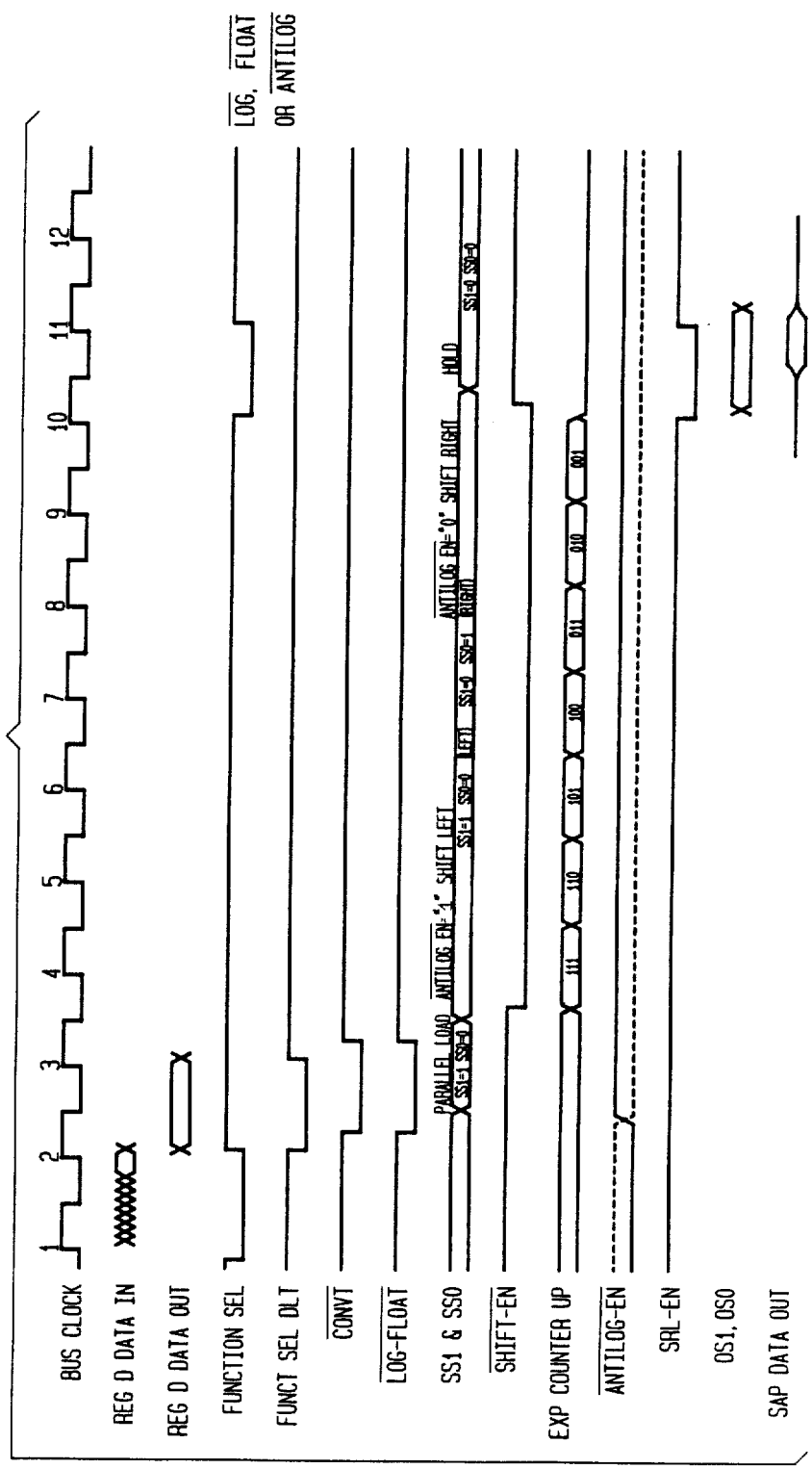
FIG. 7 is a timing diagram of the first common means of FIG. 6.
Figures 8, 8A:
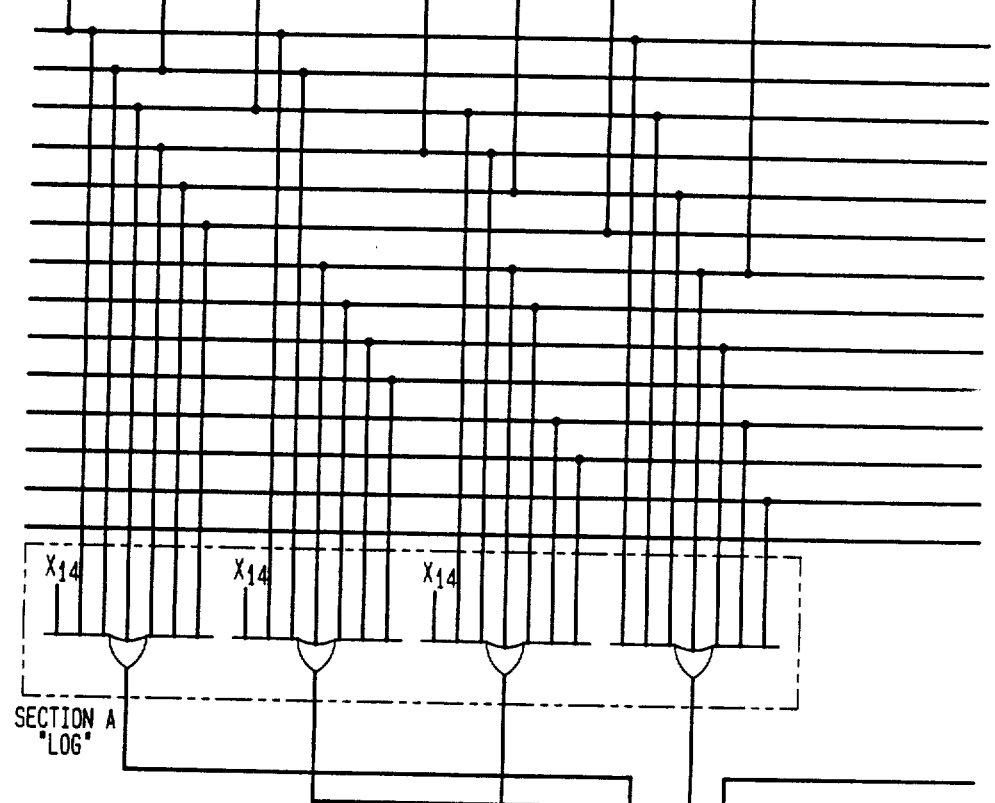
FIG. 8 comprising
FIGS. 8A, 8B and 8C is an alternative embodiment of the shifter of the first common means of FIG. 6.
Figure 8B:
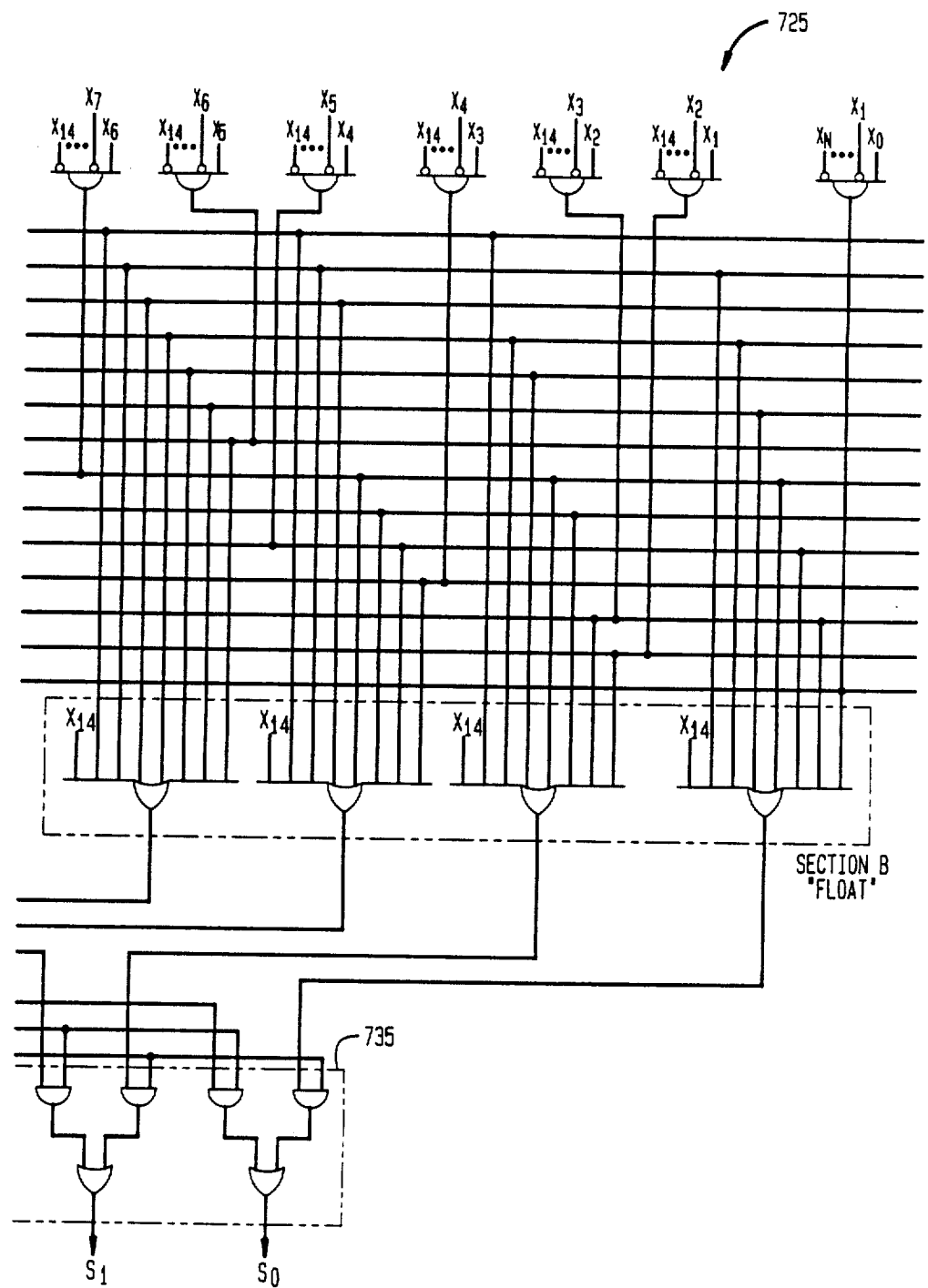
Figure 8C:
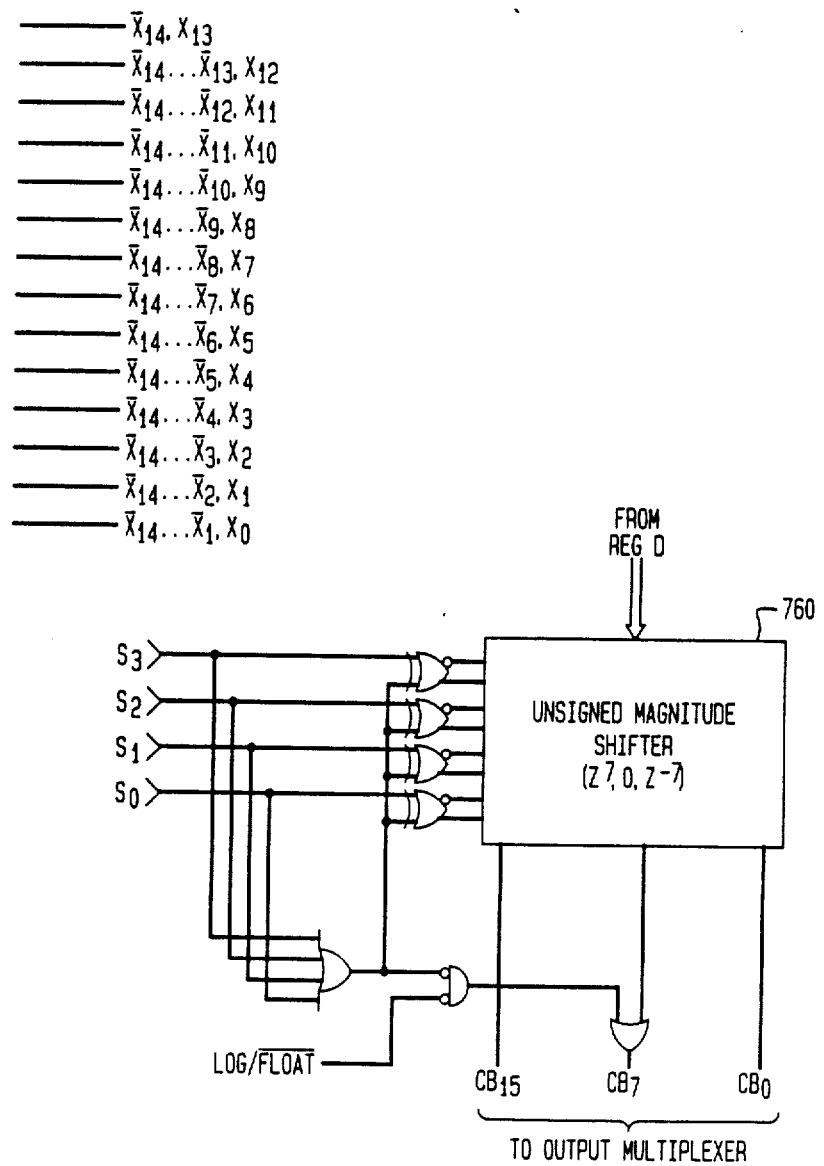
Figures 9, 9A:
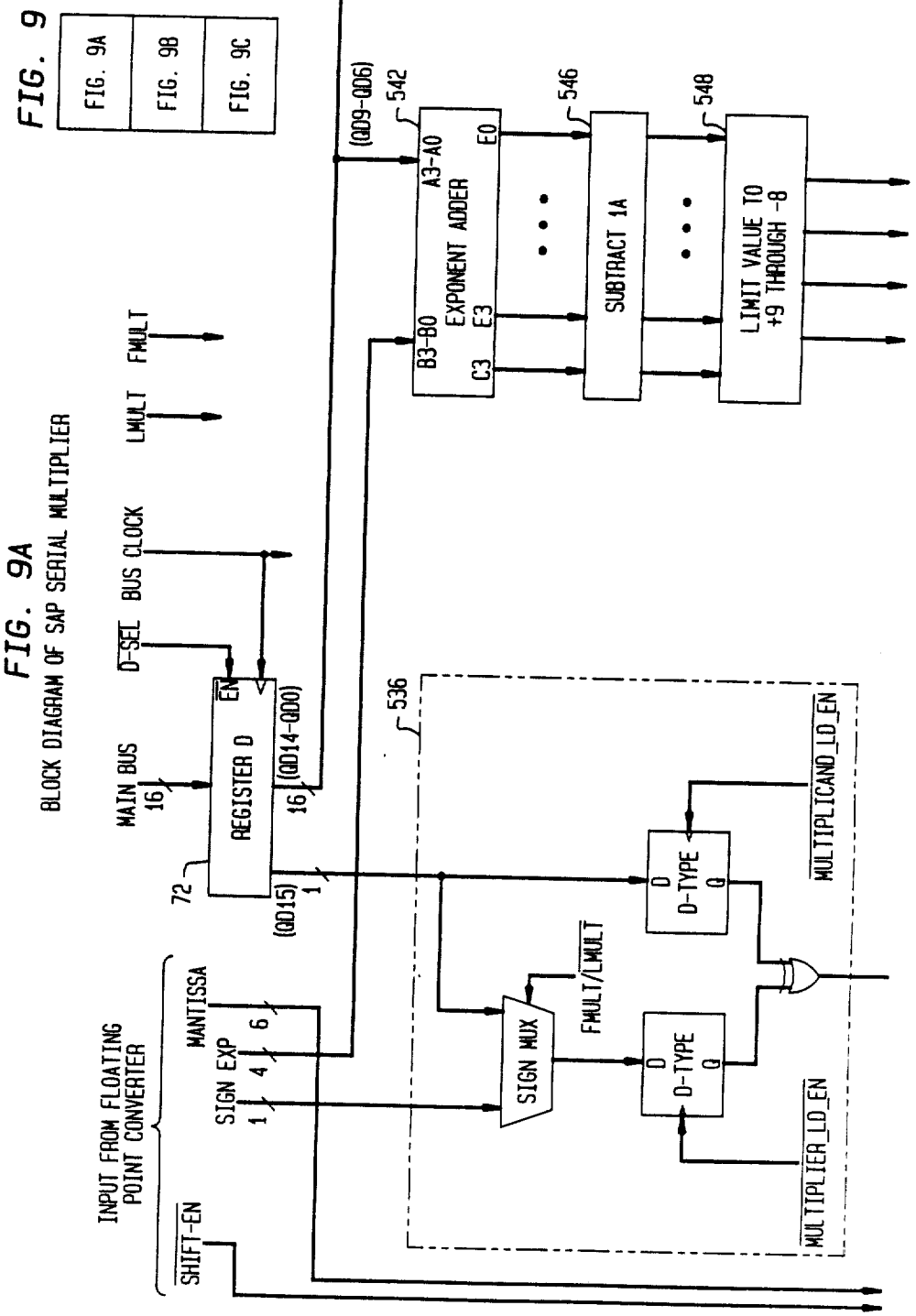
FIG. 9 comprising
FIGS. 9A, 9B and 9C is a block diagram of the second common means of the serial arithmetic processor of the digital signal processor of FIG. 1.
Figure 9B:
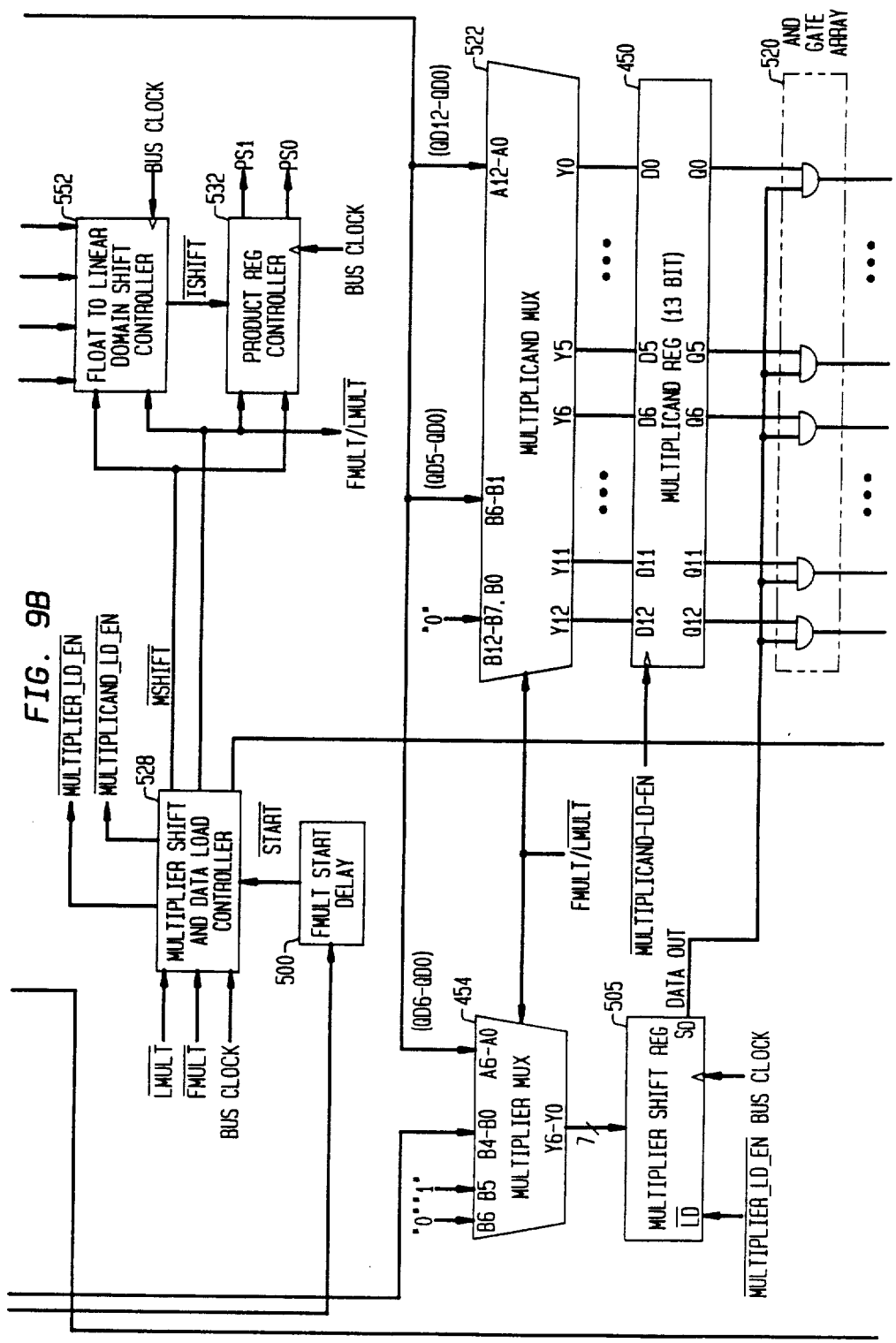
Figure 9C:
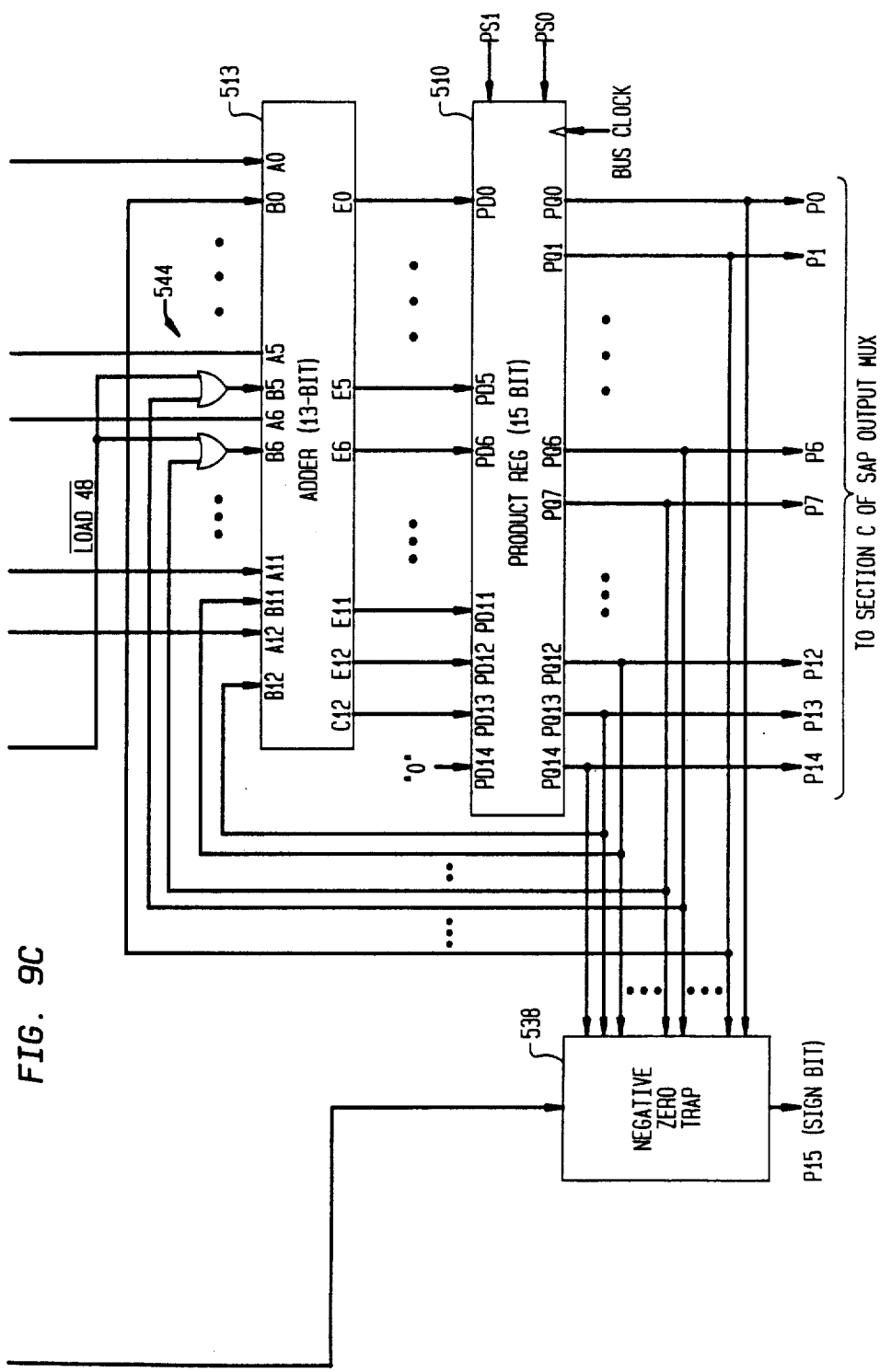
Figure 10A:
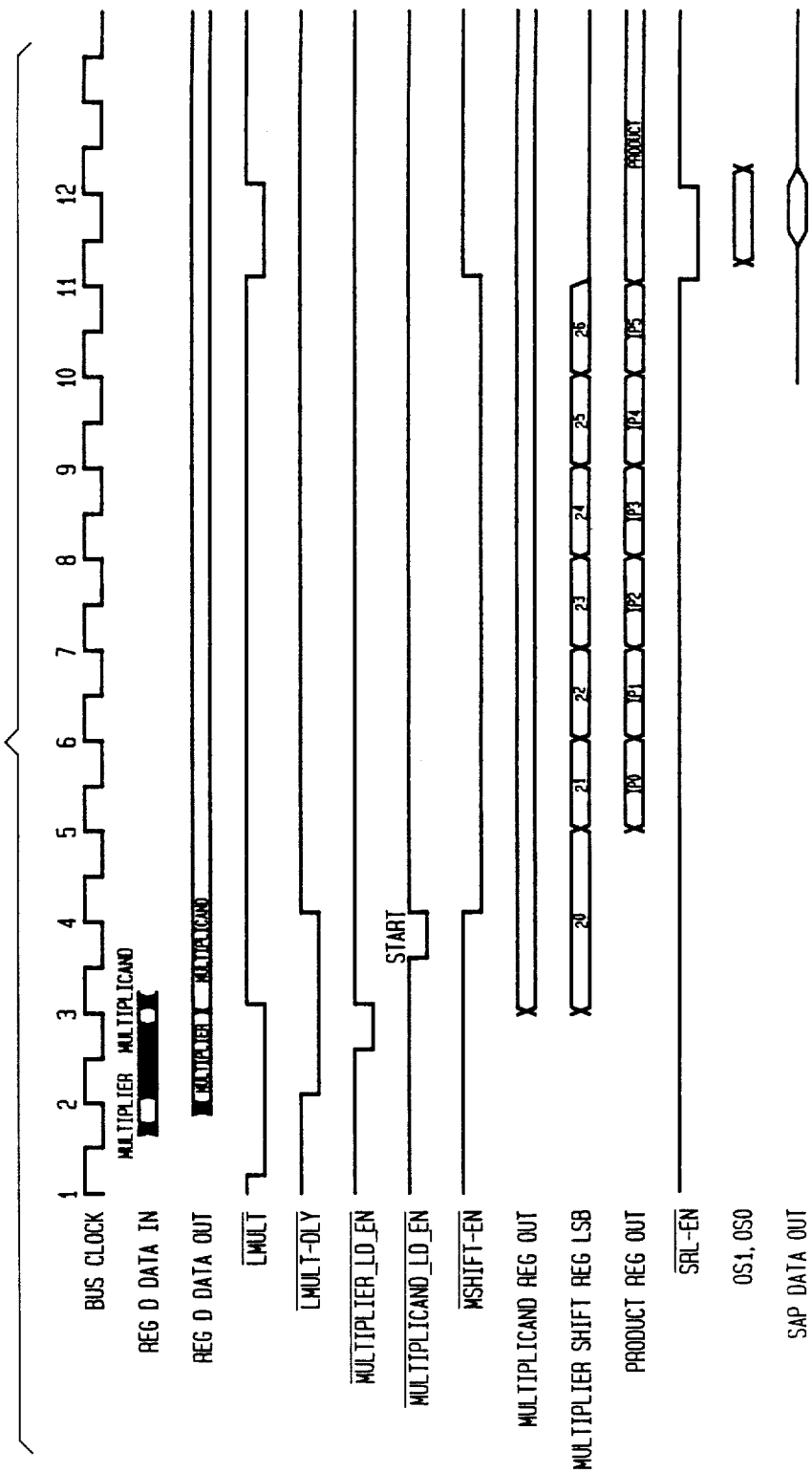
FIG. 10a is a timing diagram for the second common means of FIG. 9 for conducting an eight by fourteen bit signed magnitude multiplication.

Turning to FIG. 3, it is seen that the microinstruction decoder 30 of the MIS 20 includes several registers as well as several multiplexers. The twenty-nine bit words exiting ROM 25 are read by several of the registers depending upon the field to which the word belongs. Thus, a microinstruction field decoder 202 receives the most significant bits I28 and I27 of the ROM word and provides signals to enable the other registers as desired. The enabling of the registers for a particular field is indicated by the letters "FLD", the number of the field enabled, and an arrow into the register.

Where an arithmetic, logical, or data move operation is to be conducted (field "00"), bits I26 through I23 are sent through multiplexer 204 to the enabled PALU register 206 which sends the bits as function control bits to the PALU. In a similar manner, bits I22-I19 are sent through multiplexer 208 to the enabled shift control register 212 which sends the bits as shift control bits to the shifter of the PALU. Both multiplexers 204 and 208, as will be described in greater detail hereinafter, are under the control of the microinstruction sequencer controller 32. Bits I18 through I15 are sent to the destination register 216 which selects the registers in the DSP to receive the results of the operation, while bits I12 and I11 are sent to one of four decoder 218 and then to source register 222 (which also receives bits I14 and I13 which decodes the elements of the RAM section) where they are used to decode which section of the DSP (in this case the PALU) is to drive the bus 39.

In the field "00" arrangement, bits I10-I6 are sent to the secondary microinstruction field decoder register 226 which decodes the secondary microinstructions and provides corresponding control signals as indicated to the I/O section of the ADPCM VLSI device as well as to the various sections of the DSP. Finally, bits I5-I0 are sent via multiplexer 228 to the RAM address register 232 to specify the RAM read or write address. As indicated, the MIS controller 32, can also control multiplexer 228 and can specify that the RAM address to be specified is the address indicated by the six lsb's on the bus 39. In this manner the LDMB instruction is implemented Turning to field "01", it will be appreciated that the only circuitry which decodes field "01" is the field decoder 202 which receives the two msb's, the secondary field decoder 226 which receives bits I26, I25 and I0 and generates the RTEI, RTDI, and RESET ENABLE control signals, and the MIS controller 32 which in field "01" receives the remaining bits except for bits I24 through I15. As aforestated with regard to Tables 2a and 2b, bits I8-I4 are used to determine which flag input into the MIS controller 32 is to be read, while bits I10, I9, and I3 and I2 are used to permit the microsequencer controller 32 to control the stack 36, and the next address multiplexer 38. Bits I1 and I0 which are also sent to the MIS controller 32 permit the controller 32 to specify a one or two clock cycle operation (by causing the microinstruction register 33 and pointer to the ROM to not provide an additional microinstruction to decode and execute in the case of a two clock cycle operation). Bits I26, I25 and I0 are sent to the secondary field decoder 226, where I26 and I25 are decoded and generate the RTEI and RTDI signals, while I0 is used to reset all the MIS circuitry for the RESET operation. Bits I24 through I15 which set forth a direct branch address (or indicate a bus directed address) are sent to the microinstruction register 33 via the next address register 38 via an internal bus 37 (seen in FIG. 1).

In field "2" ("10"), the microinstruction field decoder 202 receives bits I28 and I27, the destination register 216 receives bits I18-I15, the source register 222 and one of four decoder 218 receives bits I14-I11, and the secondary microinstruction field decoder 226 receives bits I10-I6 just as in field "0" ("00"). However, bits I26-I19, I14, I13 and I5-I0 are sent to the ROM data coefficient register 236 from whence they are sent out on the bus 39 to the registers defined by destination register 216.

For the conditional ALU operations of field "3" ("11"), the microinstruction field decoder 202, the destination register 216, and the source register 222 and one of four decoder 218 receive bits I28-27, I18-15 and I12-I11 respectively (bits I14 and I13 which specify the circuitry driving the internal RAM bus being irrelevant in field "3"). The remainder of the bits are divided among two sets of bits (I23-I20, and I3-I0) for instructing the PALU as to the function it is to perform, two sets of shift bits (I22-I19, and I14-I13 and I10-I9) for instructing the shifter of the PALU as to the shifting it is to perform, a set of control bits (I8-I4) for instructing the MIS controller 32 as to which set of PALU and shift bits are to be passed through multiplexers 204 and 208 to the ALU and shift registers 206 and 212. Thus, the MIS controller 32, based on flag inputs which are specified by bits I8 through I4, controls multiplexers 204 and 208 to allow only on set of PALU function control bits to the PALU register 206 and the corresponding set of PALU shift control bits to the shift register 212.

The operation of various elements of the MIS 20 seen in FIGS. 1 and 3 may be better understood from the following sequence of microinstructions:

| | | | |
|---|---|---|---|
| 8∅∅ | CPSA: | LABEL; | Call "Label" if Reg. A >= ∅ |
| 8∅1 | MVC: | *; | Move contents of Reg. C to bus |
| | SSTC: | MEM.LOC 7; | Store contents of Reg. C in RAM memory location 7 (secondary microinstruction) |
| 8∅2 | LDMB: | A; | Load Reg. A with value in memory loc. specified by value on bus |
| 8∅3 | ... | | |
| 1∅22 LABEL | AGT: | C; | IF value in Reg. A > value in |
| | SADD: | R4; | Reg. B, THEN C = (1/16)A + B; |
| | #MVA: | R2; | ELSE C = (1/4)A |
| 1∅23 | RETN: | | Return to main program (8∅1) |

Step 800 of the microinstruction sequence is seen to be a field one conditional branch operation which would be coded 01111111111110xxxx11110101111 with bits I28 and I27 being decoded by field decoder 202 to indicate field one; bits I26 and I25 going to MIS controller 32 to indicate a conditional branch; bits I24 through I15 specifying the location 1022 of the subroutine Label; bits I14 through I11 being left undefined; bits I10, I9 and I2 going to MIS controller 32 to indicate a CALL operation; bits I8 through I4 going to MIS controller 32 to indicate that the A SIGN BIT FLAG obtained from the PALU 40 is to be inspected; and bits I3, I1 and I0 going to the MIS controller 32 to MIS housekeeping functions such as the cycle length of the operation, etc. If the A SIGN BIT FLAG has a logic "1" (i.e. true), the CALL proceeds with the microsequencer controller 32 instructing the next address multiplexer 38 to send the microinstruction register 33 the value 1022 ("1111111110"), and instructing the stack 36 to place the address 801 stored in the incrementer 34 on the top of the stack.

Microinstruction 1022 is a field three microinstruction which would be coded: 11001000111011000001001111100. Bits I28 and I27 would be decoded by the field decoder 202 to control the registers to receive the remaining bits. Bits I26-I23 would provide the code for the PALU function "ADD" the values in Registers A and B, while bits I3-I0 would provide the code for the data move command "MOVE A". Likewise, bits I22 through I19 would indicate a right shift of Register A by four places (a division by sixteen) while bits I14-I13 and I10-I9 would indicate a shift right of Register A by two places (division by four), with the output of the PALU going to Register C as dictated by bits I18-I15 received by destination register 216. MIS controller 32 is told by bits I8-I4 that it should check a flag output by the comparator 46 of the PALU 40 which indicates whether the value in Register A 42 is greater than the value in Register B 44. If the flag indicates true, the MIS controller 32 causes multiplexers 204 and 208 to accept bits I26-I23 and bits I22-I19 respectively. If the flag indicates false, bits I3-I0 and I14-I13 and I10-I9 are passed to the PALU function control register 206 and PALU shift control register 212 respectively through multiplexers 204 and 208 under the control of MIS controller 32. The bus driver of the PALU is enabled to output the results of the PALU operation to Register C of the RAM section 60 by bits I12 and I11 which are read by one of four decoder 218 and source register 222 and which specify the bus driver of the PALU 40.

After a field three operation, the MIS controller 32 instructs the next address multiplexer 34 to pass the address located in the incrementer 34 to the microinstruction register 33. Thus, the next addressed location in ROM is location 1023 which sets forth a field one "RETURN" operation coded 0111xxxxxxxxxxxxxx10011111101. Without going through all the details, it will be appreciated that bits I10 and I9 which are decoded at the MIS controller 32 indicate that the "RETURN" is to be executed. In response, the MIS controller 32 causes the stack 36 to pop the address 801 from the stack and to load that via next address multiplexer 38 into the microinstruction register 33. Also, the pointer in the stack is decremented.

Turning to microinstruction 801, a field zero and secondary microinstruction are set forth in the code: 001111010011110010010000111. For field zero, bits I26-I23 instructing the PALU are set to a default value "1111", while bits I22-I19 are set to the default value "0010", since the PALU is not actively involved in the move Register C operation. Bits I18 through I15 which are read by the destination register 216 indicate that none of the registers are to receive the moved bits (although the data bus will). Bits I14 through I11 are used by the source register 222 to enable the bus drivers of the RAM section 60, and in particular Register C of the RAM section. Finally, bits I10-I0 are sent to the secondary microinstruction field register and decoder 226 where bits I10-I6 indicate that the contents of Register C are to be stored in the RAM memory, and bits I5-I0 are given to indicate that the memory loction is location "7" (i.e. "000111"). Again, since the MIS controller is aware of the field of the previous instruction, it causes the microinstruction register 33 to receive its next address from the incrementer 34 via the next address multiplexer 38.

The last microinstruction of the given sequence is also a field zero microinstruction and is coded 001110111001110xxxxxx. Here bit I15 is a value "0" to indicate to the destination register 216 that Register A is to be loaded. The value to be loaded into Register A is the data from the RAM address location specified by the least significant six bits of the data bus set in the previous cycle 801 when the contents of Register C were loaded onto the bus.

There has been described and illustrated herein a microinstruction sequencer capable of instructing arithmetic, logical and data move operations in a conditional manner. While the invention has been described in detail with regard to the microcode and the manner in which the microcode is decoded and acted upon, those skilled in the art will appreciate that different bit assignments and different functions could be provided while still carrying out the invention. For example, the microinstruction fields could be assigned different numbers. Or, if the PALU had been provided with a shifter for register B, a different set of functions could be provided, such as add the value of register A shifted left two places to the value of register B shifted right three placed. Further, if desired, microinstructions and circuitry could be provided to permit conditional data move operations where the source of data is a RAM location, or a register other than the registers of the PALU. Likewise, the destination of conditional arithmetic, logical, and data move operations could be made contingent on the conditional (e.g. IF condition TRUE, C=B; ELSE D=A; IF condition FALSE, C=PORT 1; ELSE B=PORT 2; IF condition TRUE, A=RAM LOC m; ELSE A=RAM LOC n). Additional functions of this genre might be achieved by lengthening the bit length of the microinstructions or by defining additioal microinstruction fields. Of course, appropriate multiplexer logic circuitry (as shown in phantom as multiplexers 217, 219, and 229) would have to be added in conjunction with the source decode register 222, the RAM address register 232 and the destination register 216. Therefore, it will be apparent to those skilled in the art that other changes and modifications may be made to the invention as described in the specification without departing from the spirit and scope of the invention as so claimed.

TABLE 1a.

| FIELD 0 | | |
|---|---|---|
| Arithmetic and Logical Commands: | | |
| ADD | <sh,dd> | Add reg A with shift to reg B |
| SUB | <sh,dd> | Subtract reg B from reg A with shift |
| SBB | <sh,dd> | Subtract reg A with shift from reg B |
| CVT | <dd> | Perform on reg B a Two,s Compliment to Signed Magnitude conversion, or Signed Magnitude to Two's Compliment conversion. |
| ABS | <dd> | Find the absolute value of reg B |
| NEG | <dd> | Negate reg B |
| INC | <dd> | Increment reg B |
| DEC | <dd> | Decrement reg B |
| AND | <sh,dd> | AND reg A with shift with reg B |
| ORR | <sh,dd> | OR reg A with shift with reg B |
| XOR | <sh,dd> | Exclusive-OR reg A with shift with reg B |
| NOP1 | | One cyle No-operation |
| Data Move commands: | | |
| MVA | <sh,dd> | Move reg A with shift |
| MVNA | <sh,dd> | Move compliment of reg A with shift |
| MVB | <dd> | Move reg B |
| MVNB | <dd> | Move compliment of reg B |
| MVC | <dd> | Move reg C |
| MVE | <dd> | Move reg E |
| MVP1 | <dd> | Move data port 1 |
| MVP2 | <dd> | Move data port 2 |
| LDM | <dd,mm> | Move data memory location direct |
| LDMB | <dd> | Move data memory location bus direct |

TABLE 1b

FIELD 0

Arithmetic and Logical Commands

| Mnemonic | Cycles | 28 | 27 | 26 | 25 | 24 | 23 | 22 | 21 | 20 | 19 | 18 17 16 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|
| SUB sh,dd | 1 | 0 | 0 | 0 | 0 | 0 | 0 | 0 | sh | | | dd | | | 0 | 0 | . | . | . | . | . | . | . | . | . | . | . |
| SBB sh,dd | 1 | 0 | 0 | 0 | 0 | 0 | 0 | 0 | sh | | | dd | | | 0 | 0 | . | . | . | . | . | . | . | . | . | . | . |
| ADD sh,dd | 1 | 0 | 0 | 0 | 0 | 0 | 0 | 1 | sh | | | dd | | | 0 | 0 | . | . | . | . | . | . | . | . | . | . | . |
| CVT dd | 1 | 0 | 0 | 0 | 0 | 0 | 1 | 0 | sh | | | dd | | | 0 | 0 | . | . | . | . | . | . | . | . | . | . | . |
| ABS dd | 1 | 0 | 0 | 0 | 0 | 0 | 1 | 0 | sh | | | dd | | | 0 | 0 | . | . | . | . | . | . | . | . | . | . | . |
| NEG dd | 1 | 0 | 0 | 0 | 0 | 1 | 0 | 0 | sh | | | dd | | | 0 | 0 | . | . | . | . | . | . | . | . | . | . | . |
| INC dd | 1 | 0 | 0 | 0 | 0 | 1 | 0 | 1 | sh | | | dd | | | 0 | 0 | . | . | . | . | . | . | . | . | . | . | . |
| DEC | 1 | 0 | 0 | 0 | 0 | 1 | 1 | 0 | sh | | | dd | | | 0 | 0 | . | . | . | . | . | . | . | . | . | . | . |
| XOR sh,dd | 1 | 0 | 0 | 0 | 0 | 1 | 1 | 0 | sh | | | dd | | | 0 | 0 | . | . | . | . | . | . | . | . | . | . | . |
| ORR sh,dd | 1 | 0 | 0 | 0 | 0 | 1 | 1 | 1 | sh | | | dd | | | 0 | 0 | . | . | . | . | . | . | . | . | . | . | . |
| AND sh,dd | 1 | 0 | 0 | 0 | 1 | 0 | 0 | 0 | sh | | | dd | | | 0 | 0 | . | . | . | . | . | . | . | . | . | . | . |
| NOP1 | 1 | 0 | 0 | 0 | 1 | 1 | 1 | 0 | sh | | | dd | | | 0 | 0 | . | . | . | . | . | . | . | . | . | . | . |

Data Move Commands

| Mnemonic | Cycles | 28 | 27 | 26 | 25 | 24 | 23 | 22 | 21 | 20 | 19 | 18 17 16 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|
| MVA sh,dd | 1 | 0 | 0 | 0 | 1 | 0 | 0 | 0 | sh | | | dd | | | 0 | 0 | . | . | . | . | . | . | . | . | . | . | . |
| MVNA sh,dd | 1 | 0 | 0 | 0 | 1 | 0 | 0 | 0 | sh | | | dd | | | 0 | 0 | . | . | . | . | . | . | . | . | . | . | . |
| MVB dd | 1 | 0 | 0 | 0 | 1 | 0 | 1 | 0 | 0 | 0 | 0 | dd | | | 0 | 0 | . | . | . | . | . | . | . | . | . | . | . |
| MVNB dd | 1 | 0 | 0 | 0 | 1 | 0 | 1 | 1 | 0 | 0 | 0 | dd | | | 0 | 0 | . | . | . | . | . | . | . | . | . | . | . |
| MVC dd | 1 | 0 | 0 | 0 | 1 | 1 | 0 | 0 | 0 | 0 | 0 | dd | 0 | 0 | 0 | 0 | . | . | . | . | . | . | . | . | . | . | . |
| MVE dd | 1 | 0 | 0 | 0 | 1 | 1 | 0 | 1 | 0 | 0 | 0 | dd | 0 | 1 | 0 | 0 | . | . | . | . | . | . | . | . | . | . | . |
| MVP1 dd | 1 | 0 | 0 | 0 | 1 | 1 | 1 | 0 | 0 | 0 | 0 | dd | 1 | 0 | 1 | 0 | . | . | . | . | . | see table 5a, 5b | see table 5a, 5b | | | | |
| MVP2 dd | 1 | 0 | 0 | 0 | 1 | 1 | 1 | 1 | 0 | 0 | 0 | dd | 1 | 0 | 1 | 0 | . | . | . | . | . | see table 5a, 5b | see table 5a, 5b | | | | |
| LDM dd,mm | 1 | 0 | 0 | 0 | 1 | 1 | 1 | 1 | sh | | | dd | | | 1 | 0 | table 5a,5b | | 1 | 1 | 0 | M5 | M4 | M3 | M2 | M1 | M0 |
| LDMB dd | 1 | 0 | 0 | 0 | 1 | 1 | 1 | 1 | 0 | 0 | 0 | L8 | 1100 | | | 0 | 0 | 1 | 1 | 0 | X | X | X | X | X | X |

"." see table 5a, 5b, and 5c    "X" denotes don't care
"sh" Shift Values (R = right shift, L = left shift)

| | | | "dd" Destination Code |
|---|---|---|---|
| R4 | 0011 | 0 | 0100 | L4 | 1000 | | 0 | 1 | 1 | REG A |
| R3 | 0010 | L1 | 0101 | L5 | 1001 | | | | | REG B |
| R2 | 0001 | L2 | 0110 | L6 | 1010 | | | | | REG C |
| R0 | 0000 | L3 | 0111 | L7 | 1011 | | | | | REG D |

TABLE 2a

Unconditional branch Commands:

| | | |
|---|---|---|
| JUMP | \<n\> | Jump direct |
| JUMP | \<*\> | Jump bus direct |
| CALL | \<n\> | Call direct |
| CALL | \<*\> | Call bus direct |
| RETN | | Return from call |
| RTEI | | Return from encode interrupt |
| RTDI | | Return from decode interrupt |
| CLRE | | Clear encode flag |
| CLRD | | Clear decode flag |
| REST | | Reset program counter |

Conditional branch Commands:

| | | |
|---|---|---|
| iPSA[N] | \<n\> or \<*\> | If reg A is positive |
| iNGA[N] | \<n\> or \<*\> | If reg A is negative |
| iPSB[N] | \<n\> or \<*\> | If reg B is positive |
| iNGB[N] | \<n\> or \<*\> | If reg B is negative |
| iGTT[N] | \<n\> or \<*\> | If reg A is greater than reg B |
| iLST[N] | \<n\> or \<*\> | If reg A is less than reg B |
| iGTE[N] | \<n\> or \<*\> | If reg A is greater than or equal to reg B |
| iLTE[N] | \<n\> or \<*\> | If reg A is less than or equal to reg B |
| iEQU[N] | \<n\> or \<*\> | If reg A is equal to reg B |
| iMLW[N] | \<n\> or \<*\> | If Mu-law flag is set |
| iALW[N] | \<n\> or \<*\> | If A-law flag is set |
| iCYF[N] | \<n\> or \<*\> | If PALU Carry flag is set |
| iOVF[N] | \<n\> or \<*\> | If PALU Overflow flag is set |
| iECF[N] | \<n\> or \<*\> | If Encode flag is set |
| iDCF[N] | \<n\> or \<*\> | If Decode flag is set |
| iPTH[N] | \<n\> or \<*\> | If PCM pass-through flag is set |
| iNAM[N] | \<n\> or \<*\> | If North American flag is set |
| iEXT[N] | \<n\> or \<*\> | If External flag is set |

TABLE 2b

FIELD 1

Unconditional Branch Commands

| Mnemonic | Cycles | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|
| REST | 1 | 0 | 0 | 1 | 1 | x | x | x | x | x | x | x | x | x | x | x | x | x | x | 0 | 0 | 0 | 1 | 1 | 1 | 1 | 1 | 1 | 1 | 1 |
| JUMP n | 1 | 0 | 1 | 1 | 1 | n9 | n8 | n7 | n6 | n5 | n4 | n3 | n2 | n1 | n0 | x | x | x | x | 0 | 1 | 0 | 1 | 1 | 1 | 1 | 1 | 0 | 0 | 1 |
| JUMP * | 1 | 0 | 1 | 1 | 1 | x | x | x | x | x | x | x | x | x | x | 0 | 1 | 1 | 0 | 1 | 1 | 0 | 1 | 1 | 1 | 1 | 1 | 0 | 0 | 1 |
| CALL n | 1 | 0 | 1 | 1 | 1 | n9 | n8 | n7 | n6 | n5 | n4 | n3 | n2 | n1 | n0 | x | x | x | x | 0 | 1 | 0 | 1 | 1 | 1 | 1 | 0 | 1 | 0 | 1 |
| CALL * | 1 | 0 | 1 | 1 | 1 | x | x | x | x | x | x | x | x | x | x | 0 | 1 | 1 | 0 | 1 | 1 | 0 | 1 | 1 | 1 | 1 | 0 | 1 | 0 | 1 |
| RETN | 1 | 0 | 0 | 1 | 1 | x | x | x | x | x | x | x | x | x | x | x | x | x | x | 0 | 0 | 0 | 1 | 1 | 1 | 1 | 1 | 1 | 0 | 1 |
| RTEI | 1 | 0 | 0 | 1 | 1 | x | x | x | x | x | x | x | x | x | x | x | x | x | x | 0 | 0 | 0 | 1 | 1 | 1 | 0 | 1 | 1 | 0 | 1 |
| RTDI | 1 | 0 | 0 | 1 | 1 | x | x | x | x | x | x | x | x | x | x | x | x | x | x | 0 | 0 | 0 | 1 | 1 | 1 | 1 | 1 | 1 | 0 | 1 |

"x" denotes don't care

Encode and Decode Flag Clear Commands

| Mnemonic | Cycles | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|
| CLRE | 1 | 0 | 1 | 0 | 1 | x | x | x | x | x | x | x | x | x | x | x | x | x | x | 0 | 0 | 1 | 1 | 1 | 1 | 1 | 1 | 1 | 1 | 0 |
| CLRD | 1 | 0 | 1 | 0 | 1 | x | x | x | x | x | x | x | x | x | x | x | x | x | x | 1 | 1 | 0 | 1 | 1 | 1 | 1 | 1 | 0 | 0 | 1 |

"x" denotes don't care

Conditional Direct Branch Commands

| Mnemonic | Cycles | 28 | 27 | 26 | 25 | 24 | 23 | 22 | 21 | 20 | 19 | 18 | 17 | 16 | 15 | 14 | 13 | 12 | 11 | 10 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|
| iPSA[N] n | 2 | 0 | 0 | 1 | 1 | n9 | n8 | n7 | n6 | n5 | n4 | n3 | n2 | n1 | n0 | x | x | x | x | 1 | N#1 | 1 | 0 | 1 | 0 | 0 | p | 1 | 1 |
| iNGA[N] n | 2 | 0 | 0 | 1 | 1 | n9 | n8 | n7 | n6 | n5 | n4 | n3 | n2 | n1 | n0 | x | x | x | x | 1 | N#0 | 1 | 0 | 1 | 0 | 1 | p | 1 | 1 |
| iPSB[N] n | 2 | 0 | 0 | 1 | 1 | n9 | n8 | n7 | n6 | n5 | n4 | n3 | n2 | n1 | n0 | x | x | x | x | 1 | N#1 | 1 | 0 | 1 | 0 | 1 | p | 1 | 1 |
| iNGB[N] n | 2 | 0 | 0 | 1 | 1 | n9 | n8 | n7 | n6 | n5 | n4 | n3 | n2 | n1 | n0 | x | x | x | x | 1 | N#0 | 1 | 0 | 1 | 0 | 1 | p | 1 | 1 |
| iGTT[N] n | 2 | 0 | 0 | 1 | 1 | n9 | n8 | n7 | n6 | n5 | n4 | n3 | n2 | n1 | n0 | x | x | x | x | 1 | N | 0 | 0 | 0 | 0 | 0 | p | 1 | 1 |
| iLST[N] n | 2 | 0 | 0 | 1 | 1 | n9 | n8 | n7 | n6 | n5 | n4 | n3 | n2 | n1 | n0 | x | x | x | x | 1 | N | 0 | 0 | 0 | 0 | 1 | p | 1 | 1 |
| iGTE[N] n | 2 | 0 | 0 | 1 | 1 | n9 | n8 | n7 | n6 | n5 | n4 | n3 | n2 | n1 | n0 | x | x | x | x | 1 | N | 0 | 0 | 0 | 0 | 0 | p | 1 | 1 |
| iLTE[N] n | 2 | 0 | 0 | 1 | 1 | n9 | n8 | n7 | n6 | n5 | n4 | n3 | n2 | n1 | n0 | x | x | x | x | 1 | N | 0 | 0 | 0 | 0 | 1 | p | 1 | 1 |
| iEQU[N] n | 2 | 0 | 0 | 1 | 1 | n9 | n8 | n7 | n6 | n5 | n4 | n3 | n2 | n1 | n0 | x | x | x | x | 1 | N | 0 | 0 | 0 | 1 | 0 | p | 1 | 1 |
| iMLW[N] n | 1 | 0 | 0 | 1 | 1 | n9 | n8 | n7 | n6 | n5 | n4 | n3 | n2 | n1 | n0 | x | x | x | x | 1 | N#0 | 1 | 0 | 0 | 0 | 1 | p | 0 | 1 |
| iALW[N] n | 1 | 0 | 0 | 1 | 1 | n9 | n8 | n7 | n6 | n5 | n4 | n3 | n2 | n1 | n0 | x | x | x | x | 1 | N#1 | 1 | 0 | 0 | 1 | 1 | p | 0 | 1 |
| iCYF[N] n | 2 | 0 | 0 | 1 | 1 | n9 | n8 | n7 | n6 | n5 | n4 | n3 | n2 | n1 | n0 | x | x | x | x | 1 | N | 0 | 0 | 1 | 0 | 0 | p | 1 | 1 |
| iECF[N] n | 1 | 0 | 0 | 1 | 1 | n9 | n8 | n7 | n6 | n5 | n4 | n3 | n2 | n1 | n0 | x | x | x | x | 1 | N | 0 | 0 | 0 | 0 | 0 | p | 0 | 1 |
| iDCF[N] n | 1 | 0 | 0 | 1 | 1 | n9 | n8 | n7 | n6 | n5 | n4 | n3 | n2 | n1 | n0 | x | x | x | x | 1 | N | 0 | 0 | 0 | 0 | 0 | p | 0 | 1 |
| iPTH[N] n | 1 | 0 | 0 | 1 | 1 | n9 | n8 | n7 | n6 | n5 | n4 | n3 | n2 | n1 | n0 | x | x | x | x | 1 | N | 0 | 0 | 0 | 1 | 1 | p | 0 | 1 |
| iNAM[N] n | 1 | 0 | 0 | 1 | 1 | n9 | n8 | n7 | n6 | n5 | n4 | n3 | n2 | n1 | n0 | x | x | x | x | 1 | N | 1 | 1 | 0 | 0 | 1 | p | 0 | 1 |
| iEXT[N] n | 1 | 0 | 0 | 1 | 1 | n9 | n8 | n7 | n6 | n5 | n4 | n3 | n2 | n1 | n0 | x | x | x | x | 1 | N | 0 | 0 | 1 | 1 | 0 | p | 0 | 1 |
| iOVF[N] n | 2 | 0 | 0 | 1 | 1 | n9 | n8 | n7 | n6 | n5 | n4 | n3 | n2 | n1 | n0 | x | x | x | x | 1 | N | 1 | 0 | 0 | 1 | 0 | p | 1 | 1 |

"1" = 1 1 (Jump or a Call, 1 0 (Return) "p" 0 (Jump), 1 (call or Return) "#" denotes Exclusive OR
"X" denotes don't care

Conditional Bus Direct Branch Commands

| Mnemonic | Cycles | 28 | 27 | 26 | 25 | 24 | 23 | 22 | 21 | 20 | 19 | 18 | 17 | 16 | 15 | 14 | 13 | 12 | 11 | 10 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|
| iPSA[N] * | 2 | 0 | 0 | 1 | 1 | x | x | x | x | x | x | x | x | x | x | 0 | 0 | 0 | 0 | 1 | N#1 | 1 | 0 | 1 | 0 | 0 | p | 0 | 1 |
| iNGA[N] * | 2 | 0 | 0 | 1 | 1 | x | x | x | x | x | x | x | x | x | x | 0 | 0 | 0 | 0 | 1 | N#0 | 1 | 0 | 1 | 0 | 0 | p | 0 | 1 |
| iPSB[N] * | 2 | 0 | 0 | 1 | 1 | x | x | x | x | x | x | x | x | x | x | 0 | 0 | 0 | 0 | 1 | N#1 | 1 | 0 | 1 | 0 | 0 | p | 0 | 1 |
| iNGB[N] * | 2 | 0 | 0 | 1 | 1 | x | x | x | x | x | x | x | x | x | x | 0 | 0 | 0 | 0 | 1 | N#0 | 1 | 0 | 1 | 0 | 0 | p | 0 | 1 |
| iGTT[N] * | 2 | 0 | 0 | 1 | 1 | x | x | x | x | x | x | x | x | x | x | 0 | 0 | 0 | 0 | 1 | N | 0 | 0 | 1 | 1 | 0 | p | 0 | 1 |
| iLST[N] * | 1 | 0 | 0 | 1 | 1 | x | x | x | x | x | x | x | x | x | x | 0 | 0 | 0 | 0 | 1 | N | 0 | 0 | 1 | 1 | 0 | p | 0 | 1 |

TABLE 2b-continued

FIELD 1

| | | | | | | | | | | | | | | | | | | | | | | | | | |
|---|---|---|---|---|---|---|---|---|---|---|---|---|---|---|---|---|---|---|---|---|---|---|---|---|---|
| iGTE[N] * | 1 | 0 | 1 | — | x | x | x | x | x | x | x | x | x | x | 0 | 0 | 0 | — | N | 0 | 1 | 0 | 0 | P | 0 | 1 |
| iLTE[N] * | 1 | 0 | 1 | — | x | x | x | x | x | x | x | x | x | x | 0 | 0 | 0 | — | N | 0 | 1 | 0 | 0 | P | 0 | 1 |
| iEQU[N] * | 1 | 0 | 1 | — | x | x | x | x | x | x | x | x | x | x | 0 | 0 | 0 | — | N | 1 | 0 | 0 | 0 | P | 0 | 1 |
| iMLW[N] * | 1 | 0 | 1 | — | x | x | x | x | x | x | x | x | x | x | 0 | 0 | 0 | — | N#0 | — | 0 | 0 | — | P | 0 | 1 |
| iALW[N] * | 1 | 0 | 1 | — | x | x | x | x | x | x | x | x | x | x | 0 | 0 | 0 | — | N#1 | — | 0 | 0 | — | P | 0 | 1 |
| iCYF[N] * | 1 | 0 | 1 | — | x | x | x | x | x | x | x | x | x | x | 0 | 0 | 0 | — | N | 0 | 0 | 0 | 0 | P | 0 | 1 |
| iECF[N] * | 1 | 0 | 1 | — | x | x | x | x | x | x | x | x | x | x | 0 | 0 | 0 | — | N | 0 | 0 | 0 | 0 | P | 0 | 1 |
| iDCF[N] * | 1 | 0 | 1 | — | x | x | x | x | x | x | x | x | x | x | 0 | 0 | 0 | — | N | 1 | 0 | 0 | 0 | P | 0 | 1 |
| iPTH[N] * | 1 | 0 | 1 | — | x | x | x | x | x | x | x | x | x | x | 0 | 0 | 0 | — | N | — | 0 | 0 | — | P | 0 | 1 |
| iNAM[N] * | 1 | 0 | 1 | — | x | x | x | x | x | x | x | x | x | x | 0 | 0 | 0 | — | N | — | 0 | — | 0 | P | 0 | 1 |
| iEXT[N] * | 1 | 0 | 1 | — | x | x | x | x | x | x | x | x | x | x | 0 | 0 | 0 | — | N | — | 0 | 0 | 0 | P | 0 | 1 |
| iOVF[N] * | 1 | 0 | 1 | — | x | x | x | x | x | x | x | x | x | x | 0 | 0 | 0 | — | N | 1 | 1 | — | 0 | P | 0 | 1 |

"1" = 11 (Jump or a Call, 1 0 (Return) "p" = (Jump), 1 (call or Return) "#" = Exclusive OR
"x" = denoted don't care TABLE 3a. FIELD 2b
Immediate Data Command:

LDD <dd,b>

TABLE 3b

Immediate Data Command

| Mnemonic | Cycles | 28 | 27 | 26 | 25 | 24 | 23 | 22 | 21 | 20 | 19 | 18 17 16 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|
| | | | | | | | | | | | | FIELD 2 | | | | | | | | | | | | | | | |
| LDD dd,b | 1 | 1 | 0 | b15 | b14 | b13 | b12 | b11 | b10 | b9 | b8 | dd | b7 | b6 | 0 | 2 | . | . | . | . | . | b5 | b4 | b3 | b2 | b1 | b0 |

TABLE 4a

FIELD 3

Conditional Arithmetic, Logical, and Data Move Commands:

| | | |
|---|---|---|
| APSA[N] | <dd> <a1,a2> | If reg A is positive execute <a1> else execute <a2> |
| ANGA[N] | <dd> <a1,a2> | If reg A is negative execute <a1> else execute <a2> |
| APSB[N] | <dd> <a1,a2> | If reg B is positive execute <a1> else execute <a2> |
| ANGB[N] | <dd> <a1,a2> | If reg B is negative execute <a1> else execute <a2> |
| AGTT[N] | <dd> <a1,a2> | If reg A is greater than reg B execute <a1> else execute <a2> |
| ALST[N] | <dd> <a1,a2> | If reg A is less than reg B execute <a1> else execute <a2> |
| AGTE[N] | <dd> <a1,a2> | If reg A is greater than or equal to reg B execute <a1> else execute <a2> |
| ALTE[N] | <dd> <a1,a2> | If reg A is less than or equal to reg B execute <a1> else execute <a2> |
| AEQU[N] | <dd> <a1,a2> | If reg A is equal to reg B execute <a1> else execute <a2> |
| AMLW[N] | <dd> <a1,a2> | If Mu-law flag is set execute <a1> else execute <a2> |
| AALW[N] | <dd> <a1,a2> | If A-law flag is set execute <a1> else execute <a2> |
| ACYF[N] | <dd> <a1,a2> | If PALU Carry flag is set execute <a1> else execute <a2> |
| AOVF[N] | <dd> <a1,a2> | If PALU Overflow flag is set execute <a1> else execute <a2> |
| AECF[N] | <dd> <a1,a2> | If Encode flag is set execute <a1> else execute <a2> |
| ADCF[N] | <dd> <a1,a2> | If Decode flag is set execute <a1> else execute <a2> |
| APTH[N] | <dd> <a1,a2> | If PCM pass-through flag is set execute <a1> else execute <a2> |
| ANAM[N] | <dd> <a1,a2> | If North American flag is set execute <a1> else execute <a2> |
| AEXT[N] | <dd> <a1,a2> | If External flag is set execute <a1> else execute <a2> |

TABLE 4b

FIELD$^3$

Conditional Arithmetic, Logical, and Data Move Commands

| Mnemonic | Cycles | 28 | 27 | 26 25 24 23 | 22 21 20 19 | 18 17 16 15 | 14 13 | 12 | 11 | 10 9 | 8 | 7 | 6 | 5 | 4 | 3 2 1 0 |
|---|---|---|---|---|---|---|---|---|---|---|---|---|---|---|---|---|
| APSA[N] dd | 2 | 1 | 1 | alu 1 | sh1 | dd | sh2msb | 0 | 0 | sh2lsb | N#1 | 1 | 0 | 1 | 0 | alu 2 |
| ANGA[N] dd | 2 | 1 | 1 | alu 1 | sh1 | dd | sh2msb | 0 | 0 | sh2lsb | N#0 | 1 | 0 | 1 | 0 | alu 2 |
| APSB[N] dd | 2 | 1 | 1 | alu 1 | sh1 | dd | sh2msb | 0 | 0 | sh2lsb | N#1 | 1 | 0 | 0 | 1 | alu 2 |
| ANGB[N] dd | 2 | 1 | 1 | alu 1 | sh1 | dd | sh2msb | 0 | 0 | sh2lsb | N#0 | 1 | 0 | 0 | 1 | alu 2 |
| AGT[N] dd | 2 | 1 | 1 | alu 1 | sh1 | dd | sh2msb | 0 | 0 | sh2lsb | N | 0 | 1 | 1 | 1 | alu 2 |
| ALT[N] dd | 2 | 1 | 1 | alu 1 | sh1 | dd | sh2msb | 0 | 0 | sh2lsb | N | 0 | 0 | 1 | 1 | alu 2 |
| AGTE[N] dd | 2 | 1 | 1 | alu 1 | sh1 | dd | sh2msb | 0 | 0 | sh2lsb | N | 0 | 1 | 1 | 0 | alu 2 |
| ALTE[N] dd | 2 | 1 | 1 | alu 1 | sh1 | dd | sh2msb | 0 | 0 | sh2lsb | N | 0 | 1 | 0 | 0 | alu 2 |
| AEQU[N] dd | 2 | 1 | 1 | alu 1 | sh1 | dd | sh2msb | 0 | 0 | sh2lsb | N | 0 | 1 | 0 | 1 | alu 2 |
| AMLW[N] dd | 2 | 1 | 1 | alu 1 | sh1 | dd | sh2msb | 0 | 0 | sh2lsb | N#0 | 1 | 0 | 0 | 0 | alu 2 |
| AALW[N] dd | 2 | 1 | 1 | alu 1 | sh1 | dd | sh2msb | 0 | 0 | sh2lsb | N#1 | 1 | 0 | 0 | 0 | alu 2 |
| ACYF[N] dd | 2 | 1 | 1 | alu 1 | sh1 | dd | sh2msb | 0 | 0 | sh2lsb | N | 0 | 0 | 0 | 0 | alu 2 |
| AECF[N] dd | 2 | 1 | 1 | alu 1 | sh1 | dd | sh2msb | 0 | 0 | sh2lsb | N | 0 | 0 | 1 | 0 | alu 2 |
| ADCF[N] dd | 2 | 1 | 1 | alu 1 | sh1 | dd | sh2msb | 0 | 0 | sh2lsb | N | 0 | 0 | 0 | 1 | alu 2 |
| APTH[N] dd | 2 | 1 | 1 | alu 1 | sh1 | dd | sh2msb | 0 | 0 | sh2lsb | N | 1 | 0 | 1 | 1 | alu 2 |
| ANAM[N] dd | 2 | 1 | 1 | alu 1 | sh1 | dd | sh2msb | 0 | 0 | sh2lsb | N | 1 | 1 | 0 | 0 | alu 2 |
| AEXT[N] dd | 2 | 1 | 1 | alu 1 | sh1 | dd | sh2msb | 0 | 0 | sh2lsb | N | 1 | 1 | 0 | 1 | alu 2 |
| AOVF[N] dd | 2 | 1 | 1 | alu 1 | sh1 | dd | sh2msb | 0 | 0 | sh2lsb | N | 1 | 1 | 1 | 0 | alu 2 |

Possible code values for "alu1" and "alu2" are defined in bit positions 26 through 23 of table 2, and for "sh1" and "sh2" in bit positions 22 through 19 of table 2. "sh2msb" represents the most significant two bits of the shift code while "sh2lsb" represents the least significant two bits of the shift code.

TABLE 5a

Secondary Field

Control Commands:

| | |
|---|---|
| LOG | Initiate signed magnitude to logarithm conversion |
| ALOG | Initiate logarithm to signed magnitude conversion |
| FLP | Initiate signed magnitude to floating point conversion |
| LML | Initiate an 8 by 16 bit linear signed magnitude multiplication |
| FML | Initiate a 4e,6m by 4e,6m floating point multiplication with conversion from floating point to signed magnitude conversion. |
| PAG0 | Select data memory page 0 |
| PAG1 | Select data memory page 1 |
| AOK | Set AOK flag high |
| ROK | Set ROK flag high |
| SOK | Set SOK flag high |

Data I/O Commands:

| | |
|---|---|
| PT3 | Load data output port 3 |

TABLE 5a-continued

Secondary Field

| | | |
|---|---|---|
| PT4 | Load data output port 4 | |
| Data Memory Store Commands: | | |
| STC | <mm> | Direct memory store of reg C |
| STCB | | Bus direct memory store of reg C |

TABLE 5b

Secondary Field

Control Commands

| Mnemonic | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| LOG   | X | X | . | . | 1 | 0 | 1 | 0 | 1 | X | X | X | X | X | X |
| ALOG  | X | X | . | . | 1 | 0 | 1 | 0 | 0 | X | X | X | X | X | X |
| FLP   | X | X | . | . | 1 | 0 | 0 | 1 | 1 | X | X | X | X | X | X |
| FML   | X | X | . | . | 1 | 0 | 0 | 0 | 1 | X | X | X | X | X | X |
| LML   | X | X | . | . | 1 | 0 | 0 | 0 | 0 | X | X | X | X | X | X |
| LML16 | X | X | . | . | 1 | 1 | 1 | 0 | 1 | X | X | X | X | X | X |
| PAG0  | X | X | . | . | 0 | 1 | 0 | 1 | 1 | X | X | X | X | X | X |
| PAG1  | X | X | . | . | 1 | 1 | 0 | 1 | 1 | X | X | X | X | X | X |
| AOK   | X | X | . | . | 1 | 1 | 0 | 0 | 1 | X | X | X | X | X | X |
| SOK   | X | X | . | . | 1 | 1 | 0 | 1 | 0 | X | X | X | X | X | X |
| ROK   | X | X | . | . | 1 | 1 | 0 | 0 | 0 | X | X | X | X | X | X |

Data Port Output Commands

| Mnemonic | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| PT3 | X | X | . | . | 1 | 0 | 1 | 1 | 1 | X | X | X | X | X | X |
| PT4 | X | X | . | . | 1 | 0 | 1 | 1 | 0 | X | X | X | X | X | X |

Memory Store Commands

| Mnemonic | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| STC m | 0 | 0 | . | . | 1 | 0 | 0 | 1 | 0 | m5 | m4 | m3 | m2 | m1 | m0 |
| ST m  | 0 | 0 | . | . | 1 | 1 | 1 | 0 | 0 | m5 | m4 | m3 | m2 | m1 | m0 |
| STCB  | 0 | 0 | . | . | 0 | 0 | 0 | 1 | 0 | X  | X  | X  | X  | X  | X  |
| STBD  | 0 | 0 | . | . | 0 | 1 | 1 | 0 | 0 | X  | X  | X  | X  | X  | X  |

"." denotes bits defined in the referencing table
"X" denotes don't care

I claim:

1. A microinstruction sequencer for conditionally instructing an arithmetic-logic unit means to conduct one of a first and a second operation, where said first and second operations differ, comprising:
   (a) ROM having a memory of m bits wide and n microinstruction words long, wherein for an m bit wide microinstruction word in said ROM which defines a conditional operation, a first plurality of bits of said m bits define said first operation for said arithmetic-logic unit to conduct, a second plurality of bits of said m bits define said second operation for said arithmetic-logic unit to conduct, and a third plurality of bits of said m bits are one or more control bits; and
   (b) selecting means for selecting one of said first and a second pluralities of bits, including control means for controlling said selection, wherein in response to at least said one or more control bits, said control means causes said selecting means to select from said first and second pluralities of bits so as to define which of said first and second operations said arithmetic-logic unit means is to conduct.

2. A microinstruction sequencer according to claim 1, where said arithmetic-logic unit being conditionally instructed by said microinstruction sequencer includes at least one shift register, wherein:
   said m bit microinstruction word in said ROM which defines a conditional operation includes a fourth and a fifth plurality of bits, said fourth and fifth plurality of bits being shift instruction bits, each for instructing said shift register of said arithmetic-logic unit as to how said shift register is to shift, and said selecting means further includes shift instruction bit selecting means for selecting from said fourth and fifth plurality of bits so as to define how the shift register of said arithmetic-logic unit is to shift, wherein said control means further controls said shift instruction bit selecting means.

3. A microinstruction sequencer according to claim 1, wherein:
   said control means includes means for reading at least one flag specified by said third plurality of bits at the end of a first clock cycle, and for causing said selecting means to select during a second clock cycle from said first and second plurality of bits based on the status of said at least one flag such that said arithmetic-logic unit is instructed by said selected plurality of bits during said second clock cycle.

4. A microinstruction sequencer according to claim 2, wherein:
   said control means includes means for reading at least one flag specified by said third plurality of bits at the end of a first clock cycle, and for causing said selecting means to select during a second clock cycle from said first and second plurality of bits and said shift instruction bit selecting means to select during a second clock cycle from said fourth and fifth plurality of bits based on the status of said at least one flag such that said arithmetic-logic unit and said shift register of said arithmetic-logic unit are instructed by their respective selected plurality of bits during said second clock cycle.

5. A microinstruction sequencer according to claim 1, where said ROM includes a pointer, further comprising:
   (c) a microinstruction address register for locating said pointer in said ROM;
   (d) an incrementer for incrementing the value of said microinstruction address register and ROM pointer location with each clock cycle;

(e) a FIFO stack for storing next addresses provided by said incrementer where a next address supplied by said microinstruction address register is a result of a branch operation;

(f) a microinstruction next address multiplexer controlled by said control means for determining from which of said incrementer, said FIFO stack, and said ROM, said next address of said microinstruction address register is to be chosen.

6. A microinstruction sequencer according to claim 5, wherein said arithmetic-logic unit is connected to said microinstruction sequencer by at least a data bus which connects at least the output of the arithmetic-logic unit to said microinstruction next address multiplexer, wherein:

said microinstruction next address multiplexer determines from which of said incrementer, said FIFO stack, said ROM, and said bus, said next address of said microinstruction address register is to be chosen.

7. A microinstruction sequencer according to claim 5, where said microinstruction sequencer is capable of instructing an associated RAM, data bus, and at least one destination register, further comprising:

(g) an arithmetic-logic unit control register for storing at least said selected plurality of bits for instructing said arithmetic-logic unit as to the function it is to perform;

(h) a source control register for receiving bits located in predefined first locations in said m bit ROM word and for instructing in response thereto which of at least said RAM, said arithmetic-logic unit, and said ROM is to drive said data bus; and (i) a destination control register for receiving bits located in predefined second locations in said m bit ROM word and for controlling in response thereto to which of said at least one destination registers data on said data bus is to be sent.

8. A microinstruction sequencer according to claim 7, further comprising:

(j) an immediate data control register for receiving bits in predefined third locations in said m bit ROM word for sending to desired of said at least one destination register;

(k) a RAM address register, for receiving bits in predefined fourth locations in said m bit ROM word and for specifying an address in said RAM to be updated; and (l) a microinstruction field decode register for receiving bits in predefined fifth locations in said m bit ROM word, and controlling in response thereto which of said registers of elements (g), (h), (i), (j), and (k) are to receive bits where at least one location of one of said predefined first, second, third, and fourth locations includes the same location in another of said predefined first, second, third and fourth locations.

9. A microinstruction sequencer according to claim 8, further comprising:

(m) a shift control register for receiving said selected shift control bits and instructing said shifter of said arithmetic-logic unit as to the manner in which it is to shift, wherein said microinstruction field decode register further controls whether said shift control register is to receive bits.

10. A microinstruction sequencer according to claim 8, where said microinstruction sequencer instructs an associated serial arithmetic processor, further comprising:

(m) secondary microinstruction field register and decoder for receiving bit located in predefined fifth locations of said m bit wide microinstruction word and instructing at least said serial arithmetic processor in response thereto, wherein, said microinstruction field decode register further controls whether said secondary microinstruction field register and decoder is to receive bits.

11. A microinstruction sequencer according to claim 1, wherein:

said first plurality of bits instructs said arithmetic-logic unit to conduct a first of two arithmetic functions, and said second plurality of bits instructs said arithmetic-logic unit to conduct a second of said two arithmetic functions.

12. A microinstruction sequencer according to claim 1, wherein:

said first plurality of bits instructs said arithmetic-logic unit to conduct an arithmetic function, and said second plurality of bits instructs said arithmetic-logic unit to conduct one of a logical function and a data move function.

13. A microinstruction sequencer according to claim 1, wherein:

said first plurality of bits instructs said arithmetic-logic unit to conduct a first of two logical functions, and said second plurality of bits instructs said arithmetic-logic unit to conduct a second of said two logical functions.

14. A microinstruction sequencer according to claim 1, wherein:

said first plurality of bits instructs said arithmetic-logic unit to conduct a logical function, and said second plurality of bits instructs said arithmetic-logic unit to conduct a data move function.

15. A microinstruction sequencer according to claim 1, wherein:

said first plurality of bits instructs said arithmetic-logic unit to conduct a first of two data move functions, and said second plurality of bits instructs said arithmetic-logic unit to conduct a second of said two data move functions.

16. A microinstruction sequencer according to claim 2, wherein:

said fourth plurality of bits instructs said shift register of said arithmetic-logic unit to conduct a shift of a first magnitude, and said fifth plurality of bits instructs said arithmetic-logic unit to conduct a shift of a second magnitude.

17. A microinstruction sequencer according to claim 16, wherein:

said first plurality of bits instructs said arithmetic-logic unit to conduct a first of two arithmetic functions, and said second plurality of bits instructs said arithmetic-logic unit to conduct a second of said two arithmetic functions.

18. A microinstruction sequencer according to claim 16, wherein:

said first plurality of bits instructs said arithmetic-logic unit to conduct an arithmetic function, and said second plurality of bits instructs said arithmetic-logic unit to conduct one of a logical function and a data move function.

19. A microinstruction sequencer according to claim 16, wherein:

said first plurality of bits instructs said arithmetic-logic unit to conduct a first of two logical functions, and said second plurality of bits instructs said arithmetic-logic unit to conduct a second of said two logical functions.

20. A microinstruction sequencer according to claim 16, wherein:

said first plurality of bits instructs said arithmetic-logic unit to conduct a logical function, and said second plurality of bits instructs said arithmetic-logic unit to conduct a data move function.

21. A microinstruction sequencer according to claim 1, where said microinstruction sequencer is for instructing said arithmetic-logic unit to send data to two individual data registers, wherein:

said m bit word in said ROM for instructing a conditional operation includes a fourth and fifth plurality of bits, said fourth and fifth plurality of bits being destination bits for instructing data to be sent from said arithmetic-logic unit to said two individual data registers, and said selecting means further includes destination bit selecting means for selecting which of said fourth and fifth plurality of bits is to determine the destination of the data in the arithmetic-logic unit, wherein said control means further controls said destination bit selecting means.

22. A microinstruction sequencer according to claim 1, where said microinstruction sequencer is for instructing said arithmetic-logic unit to send data to two different locations of a RAM coupled to said microinstruction sequencer wherein:

said m bit word in said ROM for instructing a conditional operation includes a fourth and fifth plurality of bits, said fourth and fifth plurality of bits being destination bits for instructing data to be sent from said arithmetic-logic unit to said two different RAM locations, and said selecting means further includes destination bit selecting means for selecting which of said fourth and fifth plurality of bits is to determine the RAM destination of the data in the arithmetic-logic unit, wherein said control means further controls said destination bit selecting means.

23. A microinstruction sequencer for directing conditional data move operations and for instructing a plurality of source registers, comprising:

(a) a ROM having a memory of m bits wide and n microinstruction words long, wherein for an m bit wide microinstruction word in said ROM which defines a conditional data move operation, a first plurality of bits of said m bits comprises a first data move instruction for instructing a first of said plurality of source registers to move its data, a second plurality of bits of said m bits comprise a second data move instruction for instructing a second of said plurality of source registers to move its data, and a third plurality of bits of said m bits are one or more control bits; and (b) selecting means for selecting one of said first and second pluralities of bits, including control means for controlling said selection, wherein in response to at least said one or more control bits, said control means causes said selecting means to select from said first and second pluralities of bits so as to determine which of said first and second data move instructions is to be executed.

24. A microinstruction sequencer according to claim 23, wherein:

said m bit word in said ROM which defines a conditional move operation includes a fourth and a fifth plurality of bits, said fourth and fifth plurality of bits being respectively first and second destination instruction bits for instructing data to be sent from a first of said plurality of source registers to at least two individual destination registers, and said selecting means further includes destination instruction bit selecting means for selecting from said fourth and fifth plurality of bits so as to define the destination of the data, wherein said control means further controls said destination instruction bit selecting means.

25. A microinstruction sequencer for directing conditional data move operations and for directing a RAM, comprising:

(a) a ROM having a memory of m bits wide and n microinstruction words long, wherein for an m bit wide microinstruction word in said ROM which defines a conditional data move operation, a first plurality of bits of said m bits comprises a first data move instruction for instructing said RAM to move data into a first location in said RAM, a second plurality of bits of said m bits comprise a second data move instruction for instructing said RAM to move data into a second location in said RAM, and a third plurality of bits of said m bits are one or more control bits; and (b) selecting means for selecting one of said first and second pluralities of bits, including control means for controlling said selection, wherein in response to at least said one or more control bits, said control means causes said selecting means to select from said first and second pluralities of bits so as to determine which of said first and second data move instructions is to be executed.

26. A microinstruction sequencer according to claim 25, where said microinstruction sequencer instructs said ROM to send data to at least two individual data registers, wherein:

said m bit word in said ROM which defines a conditional move operation includes a fourth and a fifth plurality of bits, said fourth and fifth plurality of bits being respectively first and second destination instruction bits for instructing data to be sent from said RAM to at least two individual data registers, and said selection means further includes destination instruction bit selecting means for selection from said fourth and fifth plurality of bits so as to define the destination of the RAM data, wherein said control means further controls said destination instruction bit selecting means.

* * * * *